United States Patent [19]
Mihalov et al.

[11] Patent Number: 6,091,054
[45] Date of Patent: *Jul. 18, 2000

[54] HEATER PLATE AND METHOD FOR USING SAME

[75] Inventors: Lori J. Mihalov, Columbus; Lewis H. Sita, Worthington; Todd A. Stevens, West Worthington; David C. Ulstad, Dublin; W. George Zeitler, Westerville, all of Ohio

[73] Assignee: Abbott Laboratories, Abbott Park, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/810,721

[22] Filed: Mar. 3, 1997

[51] Int. Cl.[7] .............................. F27B 9/06; B65B 51/10
[52] U.S. Cl. ............................................. 219/388; 53/477
[58] Field of Search .................................... 219/243, 388; 156/157, 209, 219, 275.1, 288, 290, 499, 500; 53/477, 478; 264/404; 425/398, 384

[56] References Cited

U.S. PATENT DOCUMENTS

| | | | |
|---|---|---|---|
| 600,863 | 3/1898 | Genese | 425/398 |
| 1,295,643 | 2/1919 | Varvel | 219/243 |
| 2,489,643 | 11/1949 | Hunter | 219/243 |
| 3,386,503 | 6/1968 | Corning et al. | 425/384 |
| 3,396,062 | 8/1968 | White | 425/398 |
| 3,561,057 | 2/1971 | Butzko | 425/398 |
| 3,746,497 | 7/1973 | Neil | 425/398 |
| 3,995,763 | 12/1976 | Ayres et al. | 425/398 |
| 4,778,372 | 10/1988 | Mutti et al. | 425/294 |
| 5,226,281 | 7/1993 | Han et al. | 53/478 |
| 5,571,473 | 11/1996 | Fujii | 425/384 |

*Primary Examiner*—Teresa Walberg
*Assistant Examiner*—Daniel Robinson
*Attorney, Agent, or Firm*—Brian R. Woodworth; Daniel J. Hulseberg

[57] ABSTRACT

A package is provided with a lid and container that are heat sealed together. A multi-ply sheet material is provided for being thermoformed to define the container which has a tapering wall and bulge-resistant bottom end. Prior to thermoforming the container from the sheet, the sheet is heated with oval pads on a plurality of plates which are arranged in a configuration to facilitate control of the sheet temperature. A plug is used in the thermoforming process to contact the sheet and position the sheet within a die. A lid sheet is heat sealed to the container sheet over the thermoformed containers so as to produce a pair of spaced-apart, annular bead heat seals. The package is completed by severing the sealed-together sheets at the periphery of the container with a punch and die set that produces and clean, smooth cut surface.

7 Claims, 18 Drawing Sheets

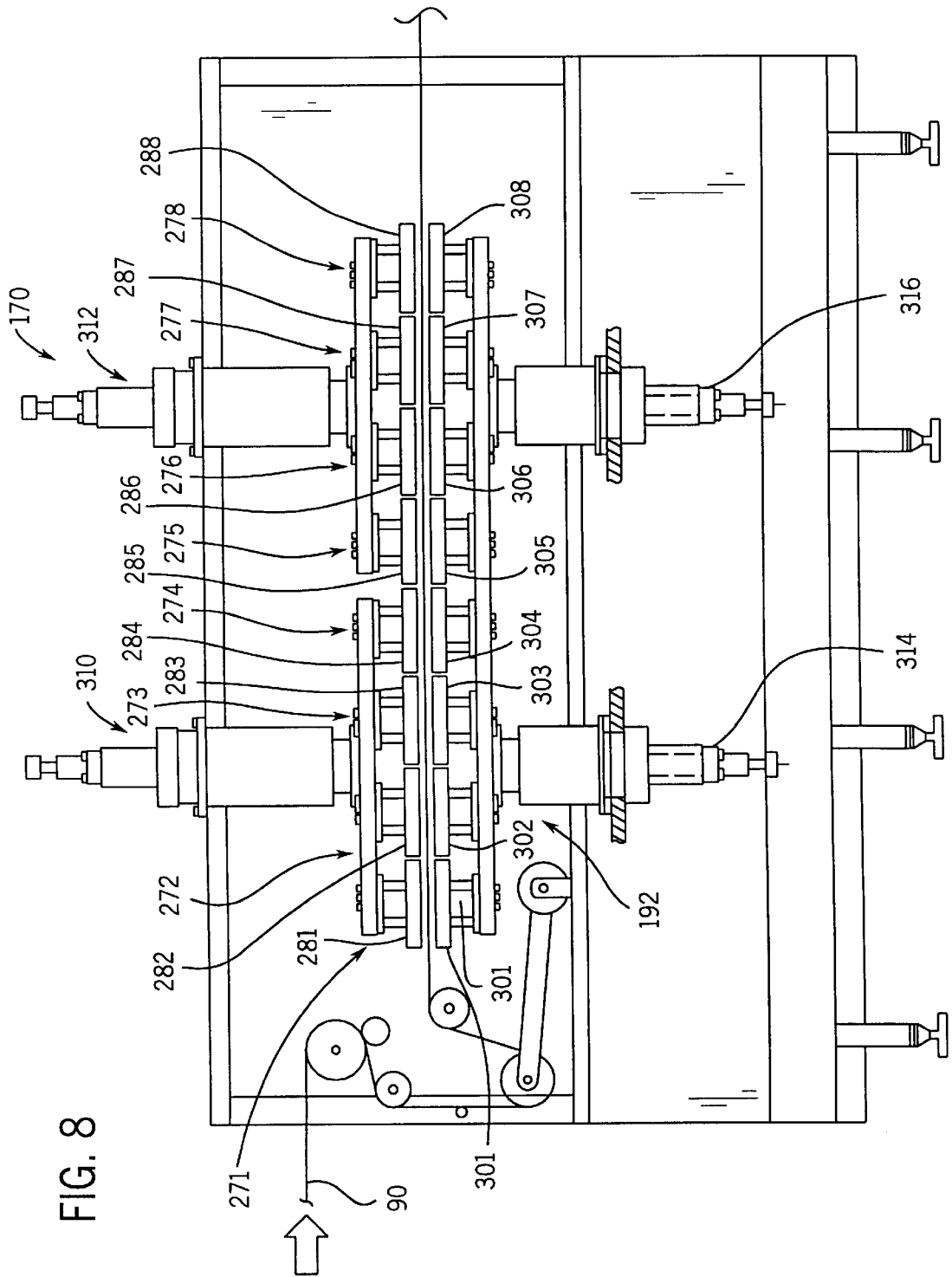

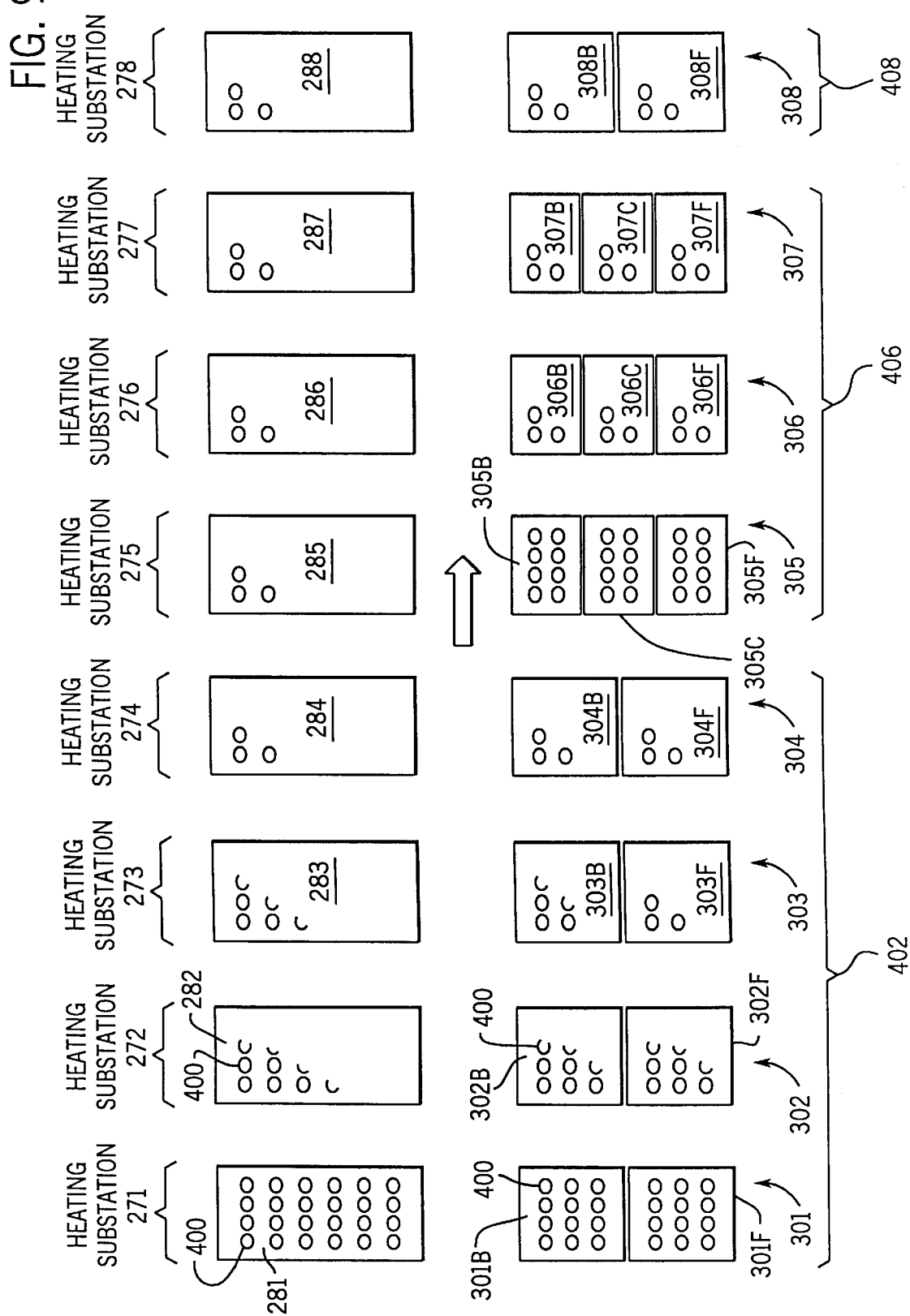

HEATER PLATE AND METHOD FOR USING SAME

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to a container and lid which are formed from separate webs of sheet material. The invention further relates to a method and apparatus for heating the container sheet material, for forming the container, for hermetically sealing the lid to the container after the container is filled with a product, and for punching the sealed lid and container from the webs of sheet material.

BACKGROUND OF THE INVENTION AND TECHNICAL PROBLEMS POSED BY THE PRIOR ART

Various packages are in use or have been proposed for containing a product, such as a food product or medical product, wherein the package is hermetically sealed until it is opened for use. One type of conventional package typically includes a cup or container comprising a hollow body having an opening or mouth surrounded by a flange to which a lid is heat sealed. While such packages function generally satisfactorily, it would be desirable to provide an improved package which could be more readily manufactured, which could be more easily used, and which would provide advantages and features not heretofore realized. For example, it is desirable to provide a container that can be opened readily and that can be used as a drinking glass.

Although packages comprising a cup and peel-away lid offer convenience of use, such packages are typically made from a relatively thin, thermoplastic sheet material. Such thin sheet material may be characterized as a web, film, sheet, sheet stock, etc., and such terms are used interchangeably herein. A conventional cup design or configuration incorporating a relatively thin sheet material may not provide the degree of strength and/or stability that is desired.

Such packaging also presents other problems. For example, the package may typically be filled with product at an elevated temperature. The elevated temperature may result from preparation of the product and/or from sterilization. In any event, the heated product may temporarily reduce the rigidity or strength of the package material (such as a thermoplastic sheet material), and the package material may tend to soften, and then deform or stretch under the weight of the product deposited within the package. This may cause the bottom of the package to bulge convexly (i.e., downwardly or outwardly). When the package ultimately cools, the convex shape at the bottom of the package may remain, thereby creating a somewhat unstable support base for the package.

Such deformed package bottoms are sometimes referred to as "rocker bottoms." A package with such a "rocker bottom" may tend to more easily tip over rather than sit flat on a table top or other flat, horizontal surface. Consequently, it would be desirable to provide an improved, low-cost package that can be processed at high speed and that, when filled with product at an elevated temperature, will have no tendency, or only a minimal tendency, to develop a "rocker bottom" or other undesirable deformation.

Packages are typically subjected to external loads during manufacturing, distribution, storage, and use. For example, packages may be stacked one on top of the other. Hermetically sealed packages fabricated from thin sheet stock or film typically do not exhibit particularly high resistance to stacking loads. Accordingly, it would be desirable to provide a package of that type having increased compression strength so as to accommodate stacking loads without crushing a corner or other portion of the package.

Such a stronger package should not, however, require excessively thick materials. Rather, such an improved package should accommodate fabrication from relatively thin sheet stock so as to permit the overall manufacturing cost to be kept low and consistent with the desirability of providing a one-time use, disposable package.

Some products which are contained within hermetically sealed packages may be deleteriously affected by certain packaging materials. For example, some packaging materials may permit an undesirable amount of ambient atmospheric substances (e.g., oxygen, water vapor, etc.) to migrate through the package into the product contained therein. This may be a significant problem for packaged products which are intended to have long shelf lives. Accordingly, it would be beneficial to provide an improved sheet material for use in forming a package or portion thereof (e.g., the cup portion of a package) which would have the desired barrier properties relative to the ambient atmosphere during long-term storage. Preferably, such an improved packaging sheet material should also be thin enough to accommodate high-speed, low-cost manufacturing of a disposable package.

Such an improved sheet material should also provide improved column strength, scratch resistance, impact strength, and superior aesthetic appearance.

Such an improved sheet material should also desirably accommodate its formation into a package body, container, or cup which is suitable for being heat-sealed with a film lid. Further, the package should preferably have a strong, hermetic, heat seal between the lid and cup which can be created with high-speed manufacturing techniques and which permits the lid to be easily removed by the user when the user desires to open the package. Further, such an improved heat seal of the lid to the cup should accommodate the optional incorporation of a lift-up tab or pull-up tab in the lid if desired.

Preferably, the improved heat seal between the package lid and package cup should also accommodate manufacturing processes wherein rows of cups and lids are heat-sealed together from a continuous web of lid material and a continuous web of cup material. The heat seal should accommodate subsequent punching or separation of the individual, sealed packages from the two continuous webs with the resulting, individual packages having a few or no rough edges or stringy, "hair-like" strands, etc., around the periphery. In this respect, the improved package body or cup material, as well as the lid material, should accommodate the severing of the individual packages from the continuous webs of material in a way which will minimize, if not substantially eliminate, rough edges or hair-like filaments and strands of material about the periphery of the package.

This is especially important where the package is used for a liquid food product which is intended to be drunk directly from the package cup after removing the package lid. In such applications, it is most desirable to provide a drinking edge which is clean and smooth.

Some types of conventional package cups and hermetically sealed lids are fabricated, respectively, from a moving web of cup material and an overlying moving web of lid material which has a composition that differs from the composition of the cup material. The cup material is typically a type of thermoplastic which can be readily punched out of the web and which has a sufficient thickness and stiffness to accommodate the punching of the package in a way that leaves a relatively smooth, non-stringy periphery. While such packages generally function satisfactorily, it would be desirable to provide an improved package design that could accommodate manufacture of the package cup portion from a thinner web of material and/or from other materials which are difficult to smoothly punch, such as polypropylene. The use of these other materials, such as polypropylene, for example, can provide improved, or more desirable, properties with respect to the following: barrier characteristics, compatibility with various products, stability over an extended shelf life, resistance to degradation from ultraviolet energy, tolerance to thermal energy, and heat-seal formation with certain types of lid materials.

Some types of packaging materials are more easily processed or formed into package bodies or cups than are other types of materials. With some types of materials, the manufacturing process must be very tightly controlled with respect to temperatures, formation forces, etc., compared to using other types of packaging materials which can accommodate a greater latitude of processing parameters. However, in some applications certain types of materials which are difficult to process may nevertheless be preferred owing to improved packaging characteristics (e.g., strength). Thus, it would be desirable to provide an improved method and apparatus for forming package bodies or containers from such types of materials, but at high speed and with a reduced product reject rate.

In particular, it would be desirable to provide an improved process and apparatus for heating the web of material so that it can be thermoformed into the package body or cup. Such an improved process and apparatus should tolerate minor misalignment of the thermoforming apparatus and web in both the machine web feeding direction and the transverse or cross direction. The process and apparatus for heating the web should be effective to rapidly and effectively heat the material in a controlled manner so that the final temperature is within a desired range at each container-forming location across width of the web.

Additionally, the improved process and apparatus should permit the high-speed formation of the body or cup portion of the package in a way that results in the creation of the desired configuration and thickness of the wall as may be necessary to provide the desired strength and stability characteristics of the package. Such processes and apparatus should function at high speed, in aseptic environments, and in a reliable manner with a minimum product reject rate.

The present invention provides an improved multi-ply sheet for a container and also provides a package comprising a container with a hermetically sealed lid having the above-discussed benefits and features. Another aspect of the present invention includes an improved method and apparatus for making the container and hermetically sealed package which can accommodate designs having the above-discussed benefits and features.

SUMMARY OF THE INVENTION

According to one aspect of the present invention, a sealed package is provided with a container or cup having a body defining a mouth and a flange around the mouth. A lid is disposed on the container across the mouth and flange. The flange has an annular, upset first bead of a heat-sealable thermoplastic material. The lid has an annular second bead of a heat-sealable thermoplastic material adjacent the first bead. The first and second beads are sealed together with a first heat seal comprising a resolidification of a melted interface portion of the first and second beads. Preferably, the lid and container flange are also attached with another heat seal between an annular, upset, third bead on the flange and an annular fourth bead on the confronting lid. In the preferred embodiment, the lid material is deformed into a recess in the container flange between the two, annular heat seals. Preferably, the lid and container flange are also lightly bonded together between the outermost annular heat seal and the peripheral edge of the flange.

According to another aspect of the invention, a container/lid heat sealing tool is provided with an improved design. The tool includes a flat, inner annular ring, (2) an annular relief step, and (3) an intermediate annular groove between the ring and relief step. The ring projects further than the relief step.

According to another aspect of the invention, a method is provided for sealing a lid to a container. The method includes the step of forming a first web of material into a container having a body defining a mouth and having a flange around the mouth. The flange has an interior side with at least a layer of heat-sealable thermoplastic material and has an oppositely facing exterior side. The method also includes the step of at least partially filling the container body with a product. According to the method, a second web of material is disposed across the container body mouth and adjacent flange. The second web has an exterior side facing away from the container and has an oppositely facing interior side. The second web has at least a layer of a heat-sealable thermoplastic material on the interior side facing the layer of heat-sealable thermoplastic material on the container flange.

The method further includes the step of forcing the second web and container flange together with a tool contacting the exterior side of the second web and with an anvil contacting the exterior side of the flange so as to press the heat-sealable thermoplastic polymer layers together. The tool has a flat, inner, annular ring, an intermediate annular groove, and a flat, outer annular relief step. The inner ring projects further toward the body flange than does the relief step. The deepest part of the groove is further from the body flange than the ring and the step.

The method further includes the step of heating the heat-sealable polymer layers so that an interface portion of the layers is in a melted condition at least for some period of time while they are pressed together.

Portions of heat-sealable polymer layers may be heated and softened prior to the first and second webs being pressed together. However, in the preferred embodiment, the tool is at an elevated temperature as it contacts the exterior side of the second web and presses the second web against the body container flange defined by the first web. At least a portion of each heat-sealable polymer layer of each web melts while the two webs are pressed together.

Subsequently, the tool is withdrawn from contacting the second web, and the melted interface portion is permitted to cool and resolidify to form a heat seal.

According to another aspect of the present invention, a multi-ply web or sheet is provided for being thermoformed into a cup, container, or the like. The sheet comprises five layers of materials which are co-extruded together to form a five-ply sheet. The five-ply sheet consists of first, second, third, fourth, and fifth layers. In the preferred embodiment, the sheet consists of only the five layers and is devoid of a regrind layer.

The sheet first layer is adapted to function as the exterior side of the package and preferably comprises polypropylene. The second layer functions as an adhesive joining the first and third layers. The third layer functions as an oxygen barrier and preferably comprises ethylene vinyl alcohol. The fourth layer functions as an adhesive joining the third and fourth layers. The fifth layer is adapted for functioning as the interior side of the package and preferably comprises polypropylene.

Preferably, the sheet has a thickness in the range from about 72.50 mils to about 95.50 mils. The first and fifth layers each preferably have a thickness in the range from about 33.75 mils to about 43.75 mils. Each adhesive layer (i.e., second and fourth layers) preferably has a thickness in the range from about 1.50 mils to about 2.50 mils. The third layer, which functions as an oxygen barrier, preferably has a thickness in the range so from about 2.00 mils to about 3.00 mils.

Another aspect of the present invention includes an apparatus for heating a web of sheet material prior to thermoforming the material into a cup, container, or similar package component having a generally circular, transverse cross section. The apparatus comprises at least one heating plate. The apparatus further includes a pad associated with the heating plate for being conductively heated by the heating plate. The pad has an oval configuration with a minor axis larger than the diameter of the largest transverse dimension of the package component portion which is to be thermoformed.

According to another aspect of the present invention, a method is provided for heating a web of material prior to forming the material into a cup, container, or similar package component having a generally circular cross section. The method comprises the steps of advancing the web along a processing path through a heating station having pads for contacting the web where each pad has an oval configuration with a minor axis larger than the diameter of the largest transverse dimension of the package component portion to be thermoformed. The method further includes the step of effecting contact between the web and pads in the heating station. The method further includes heating the pads to conduct heat into the web and then separating the web and pads.

Yet another aspect of the invention includes an apparatus for heating a web of sheet material in a controlled manner prior to formation of the material into a package component such as cup, container, or the like. The apparatus defines a web processing path along which a web of the sheet material is conveyed. A plurality of heating plates are provided adjacent the web processing path. Each heating plate has one or more contact surfaces for contacting a side of the web so as to heat one or more portions of the web by conduction. A first set of heating plates is provided with the plates arranged in pairs spaced along the path, with each pair extending across the path. A second set of heating plates is located relative to the first set of heating plates at a downstream location along the web processing path. The plates in the second set are arranged in groups of three heating plates spaced along the path, with each group of three heating plates extending across the processing path. A third set of heating plates is located relative to the second set of heating plates at a downstream location along the web processing path. The plates in the third set are arranged in at least one group along the processing path. The heating plates in each group in the third set are arranged in pairs extending across the processing path. The number of pairs of heating plates in the third set of heating plates is less than the number of pairs of heating plates in the first set of heating plates.

Another aspect of the invention includes a forming plug for use in thermoforming a container in a form, fill, and seal process. In this process, the plug is urged against a heated web of polymeric material to stretch a portion of said web within a die cavity where air pressure forces the web portion off the plug and against the walls of the die cavity so as to form at least a portion of the container.

The plug body portion defines a longitudinal axis. The body portion has a lower, cylindrical sidewall surface and a distal end. The distal end defines a peripheral, frustoconical surface extending inwardly from the sidewall surface.

The present invention also includes a method for forming a cup, container, or the like, in a form, fill, and seal process with the above-described plug. The method comprises the step of providing a tensioned web of thermoplastic material. According to the method, the forming plug is moved into the web of material while tension is maintained on the material. A portion of the material is stretched thinner and conforms to a portion of the shape of the plug frustoconical exterior surface. This locates the web portion within a die cavity where the web portion can be forced by compressed air off of the plug and against the interior surface of the die cavity which has a configuration conforming to the exterior surface of a portion of the container.

Another aspect of the present invention relates to a container which is formed from a polymeric sheet material. The container comprises a unitary structure of the sheet material which has a peripheral flange defining an opening, a downwardly and inwardly tapering hollow body defined around a longitudinal axis by a generally frustoconical, annular sidewall extending from the flange, and a bottom defined by an annular base which extends from a lower end of the body sidewall and which is adapted to engage a flat support surface along a generally circular line of contact, an annular, first end wall extending from the annular, curved, peripheral base and toward the opening, an annular, second end wall located closer to the opening than the first end wall and extending away from the first end wall both inwardly and toward the opening, and (4) a central, third end wall located closer to the opening than the second end wall and extending from the second end wall.

According to another aspect of the invention, a container is formed from a sheet material as a unitary structure having a peripheral flange defining an opening. The structure has a downwardly and inwardly tapering hollow body defined around a longitudinal axis by a generally frustoconical, annular sidewall extending from the flange. The structure has a bottom which includes an annular, curved, peripheral base extending from the lower end of the body sidewall. The sidewall increases in thickness with increasing distance from the opening.

According to yet another aspect of the present invention, a container is formed from a sheet material and comprises a unitary structure having a peripheral flange defining an opening. The structure includes a downwardly and inwardly tapering hollow body defined around a longitudinal axis by a sidewall extending from the flange. The structure has a bottom defined by an annular base extending from the lower end of the body sidewall and an end wall structure that extends radially inwardly from the peripheral base and that is located closer to the opening than is the peripheral base.

The present invention also contemplates a method for punching a sealed package from first and second webs of material. The package includes a container that is formed from the first web and that has a body defining a mouth and has a surrounding flange unitary with the remainder of the first web. The lid is to be severed from a second web extending over the container mouth and flange when the container flange is severed from the first web. The lid and container flange are attached adjacent the periphery of the flange with an annular bond which also extends radially outwardly in the sheet beyond the flange. The method comprises the steps of providing a die that has an aperture for receiving the container body and that has a bearing surface which is aligned to bear against at least an annular portion of the first web adjacent the annular bond radially outwardly of the container body and flange.

The method includes disposing the punch adjacent the second web. The punch has a peripheral cutting edge defining an acute angle. The radially outermost portion of the cutting edge has a diameter less than the diameter of the die aperture in which the container body is disposed.

The method includes effecting relative movement between the die and punch in a direction generally perpendicular to the plane of the webs so as to cut through the webs at the annular bond and thereby sever an annular inner portion of the bond from an annular outer portion of the bond at the edge of the flange.

According to yet another aspect of the invention, a method is provided for punching from first and second webs of materials a package that includes a container in the first web, the container having a body defining a mouth and having an radially outwardly extending annular flange around the mouth, the package further having a lid in the second web of material that extends across the mouth of the container, the lid being sealed to the first web. The method includes the step of providing a die having a circular aperture for receiving the container body and having a support surface for supporting or bearing against the container flange. The method further includes the step of effecting relative movement between the die and punch in a direction generally perpendicular to the plane of the webs. The punch has an annular cutting edge defining an acute included angle. The radially outermost part of the annular cutting edge has a diameter less than the diameter of the die aperture whereby an annular clearance is provided between the annular cutting edge and the die as the punch cutting edge and die assume relative positions wherein the punch cutting edge is within the die aperture upon severing the sealed lid and container from the remaining peripheral portions of the webs.

Yet another aspect of the present invention includes an apparatus for punching a sealed package from first and second webs of material wherein the package includes a container formed from the first web, the container having a body defining a mouth and a flange surrounding the mouth, the package further including a lid formed from the second web extending the container mouth and flange, wherein the webs are attached with an annular bond extending radially outwardly beyond the flange to define an annular inner portion of the bond on the flange and to define an annular outer portion of the bond beyond the flange.

The apparatus also includes a die having an aperture for receiving the container body. The aperture has a diameter larger than the outer diameter of the flange and has a bearing surface which is aligned to bear against at least an annular portion of the first web radially outwardly of the flange.

The apparatus includes a punch for engaging the second web. The punch has a cylindrical outer surface and an intersecting frustoconical inner surface which together define an acute angle peripheral cutting edge having an outer diameter which is substantially equal to the outer diameter of the flange and less than the diameter of the die aperture so as to define an annular clearance. The apparatus also includes actuation means for effecting relative movement between the die and punch in a direction generally perpendicular to the plane of the webs to cut through the webs at the annular bond between the inner and outer portions of the bond and thereby sever the package from the webs along the outer diameter of the flange.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 shows an optional cover in an exploded view above the package;

FIG. 8 is a cross-sectional view of a portion of the machine in FIG. 7 which can incorporate the modified heating plates of the present invention;

FIG. 9 is a schematic illustration of the arrangement of the heating plates according to the principles of the present invention;

DESCRIPTION OF THE PREFERRED EMBODIMENT

While the various aspects of this invention are susceptible of embodiment in many different forms, this specification and the accompanying drawings disclose only one specific form of each aspect of the invention as an example of the invention. Each aspect of the invention is not intended to be limited to the particular embodiment so described, however. The scope of the invention is pointed out in the appended claims.

For ease of description, the articles and apparatus of this invention are described in an upright operating position as depicted in the accompanying figures, and terms such as upper, lower, horizontal, etc., are used with reference to this position. It will be understood, however, that the articles and apparatus of this invention may be disposed, stored, and/or used, at least temporarily, in an orientation other than that described.

Figures illustrating the apparatus and method of the invention show some mechanical elements that are known and that will be recognized by one skilled in the art. The detailed descriptions of such known elements are not necessary to an understanding of the invention, and accordingly, such known elements are herein described only to the degree necessary to facilitate an understanding of the novel features of the present invention.

THE PACKAGE

Figure 1:
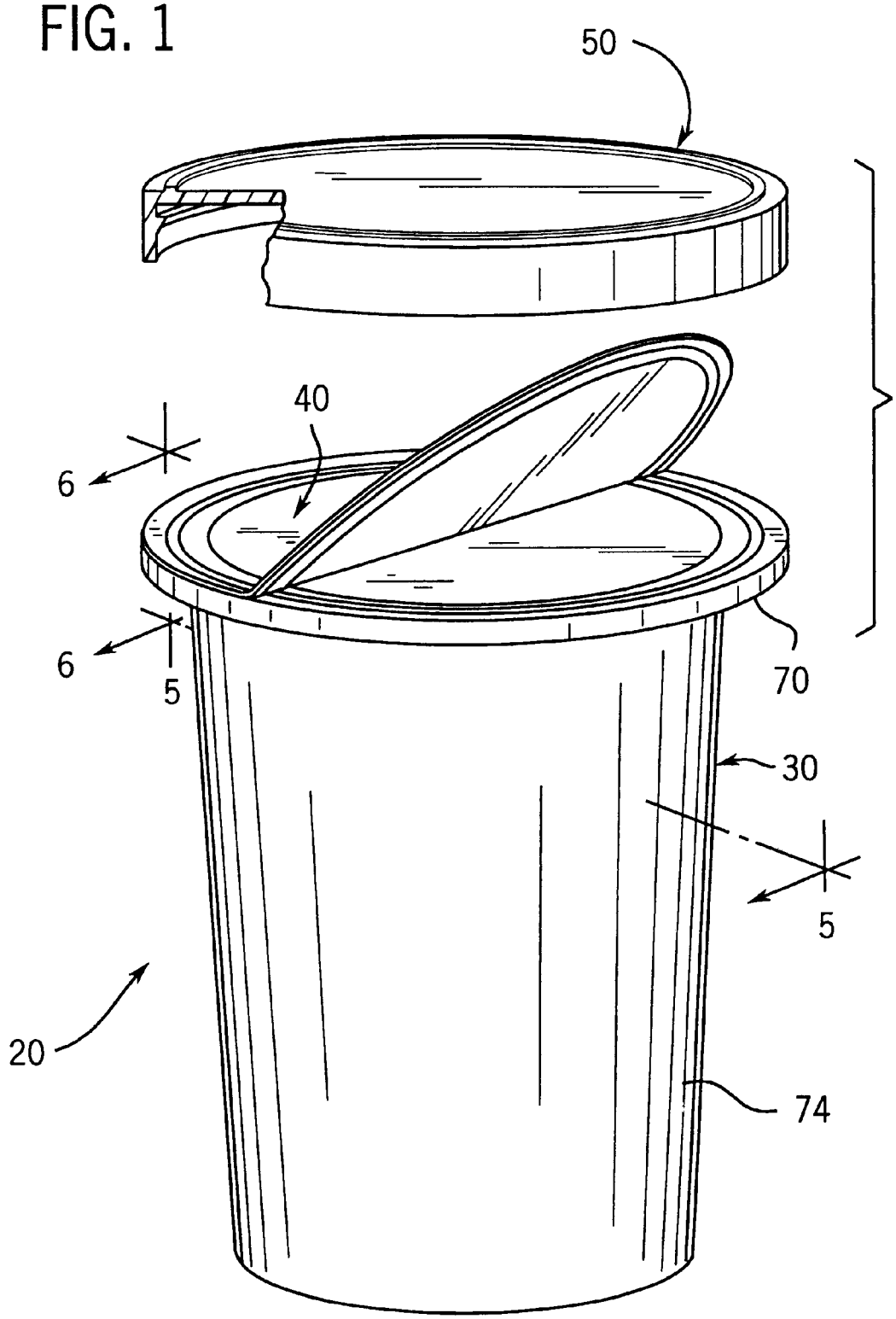
FIG. 1 is a perspective view of a package embodying various features of the present invention.

FIG. 1 illustrates a package 20 which incorporates various aspects of the present invention. The package 20 may be employed for packaging a food product or medical product by means of an aseptic filling process following sterilization of the product. Such a process does not require terminal sterilization, thereby eliminating, or at least substantially minimizing, the possibility of changes in, or damage to, the product and/or package that might occur during terminal sterilization.

Various features of the package 20 are designed to accommodate (1) formation of the package components, (2) aseptic filling of a package container with a product, and (3) closure and sealing of the package components. Further, the package 20 employs features of the present invention which accommodate high speed, high volume production of the completed package with automatic machinery.

The improved package design features also permit the use of relatively thin sheet material for the package components while providing the desired strength, particularly with respect to resistance to bulging and crushing. The package also has improved scratch resistance, high impact strength, and a desirable aesthetic appearance.

The preferred embodiment of the package 20 illustrated, although manufactured from relatively thin sheet material, provides various desired properties relative to long-term product storage. The preferred materials employed in the package are compatible with a wide variety of products, are stable over an extended shelf life, resist degradation from ultraviolet energy, are tolerant of thermal energy, and provide superior heat-seal formation characteristics with respect to the package closure seal.

THE SHEET FROM WHICH THE PACKAGE CONTAINER IS FORMED

The package 20 includes a cup or container 30 and a sealed lid 40 which has an integral pull tab or lift tab 42. The terms "cup" and "container" are used herein interchangeably to refer to the structure which is formed with one closed end and one open end that can be subsequently closed or sealed with the lid 40. An optional snap-fit overcap 50 may be provided for snap-fit engagement with the container 30 over the lid 40.

Figure 2:
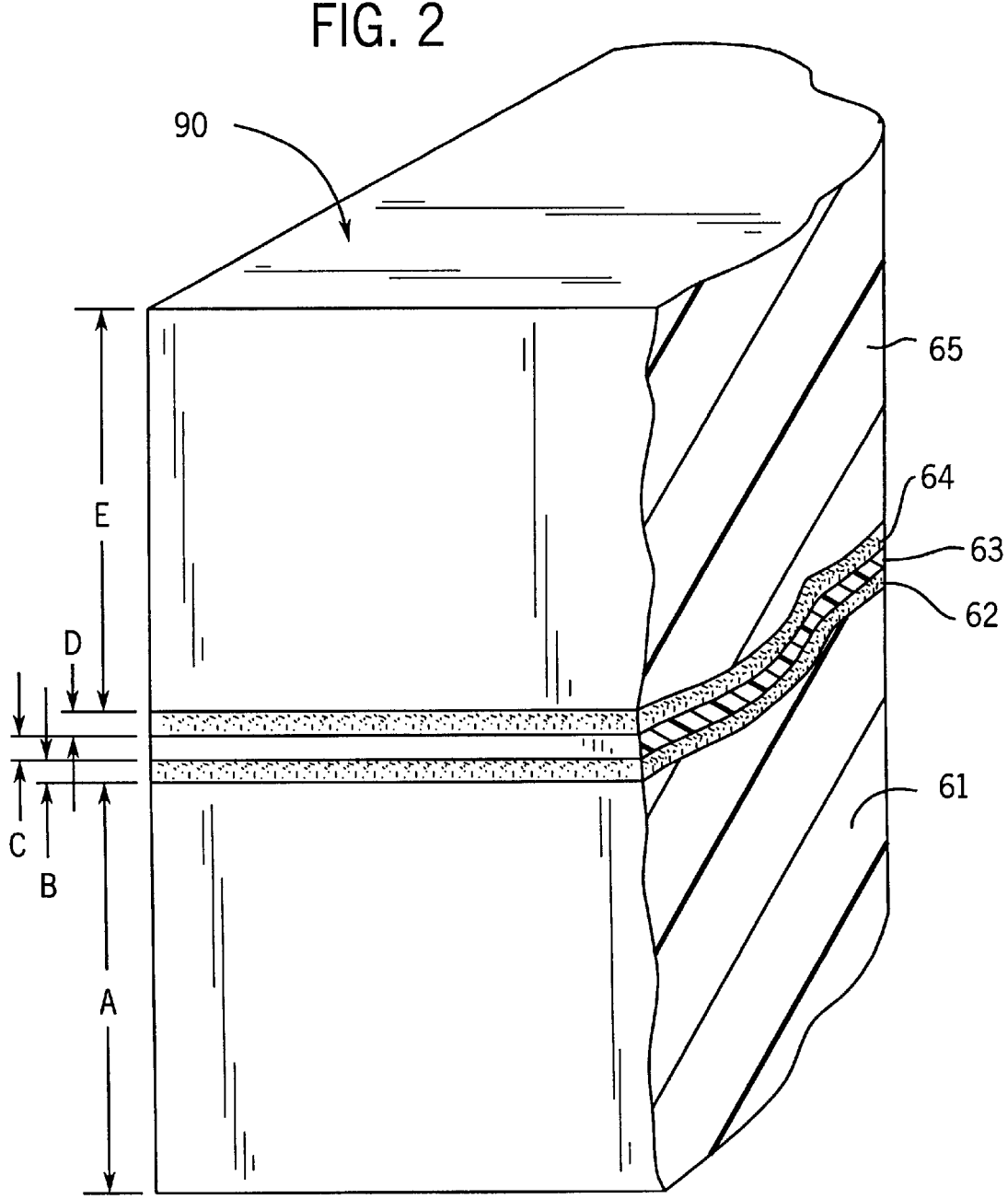
FIG. 2 is a fragmentary, cross-sectional view of a sheet of material that can be used to form the container which is part of the package shown in FIG. 1.

According to one aspect of the invention, the cup or container 30 is preferably thermoformed from a novel, multi-ply web or sheet 90 which is shown in cross section in FIG. 2. The sheet consists of five layers of material co-extruded together to form a five-ply sheet consisting of a first layer 61, a second layer 62, a third layer 63, a fourth layer 64, and a fifth layer 65.

The first layer 61 is adapted for functioning as the exterior side of the package container 30 and preferably comprises polypropylene. In the preferred embodiment, the polypropylene is grade 7292N sold under the brand name ESCORENE by Exxon Chemical Company, P.O. Box 3272, Houston, Tex. 77253-3272.

Preferably, the polypropylene used for the first layer 61 is produced with a controlled cooling of the nucleated polypropylene to maximize crystallinity and orientation so as to increase the flexural modulus of the material. Preferably, the polypropylene has an impact block copolymer polypropylene structure which balances good molecular flexibility (which provides improved impact strength) with relative stiffness (which provides increased creep resistance).

The polypropylene first layer 61 also preferably includes a nominal 4% rutile grade titanium dioxide to provide a light barrier and to enhance the appearance of the package such that the polypropylene first layer 61 has what lay people regard as, or associate with, a technical or medical appearance.

The second layer 62 functions as an adhesive joining the first layer 61 and third layer 63. Preferably, the adhesive is grade QF 551A sold under the trademark ADMER by Mitsui Petrochemicals (America), Ltd., 250 Park Avenue, Suite 950, New York, N.Y. 10177-0056.

The third layer functions as an oxygen barrier and comprises ethylene vinyl alcohol. Preferably, the ethylene vinyl alcohol is grade J102 sold under the trademark EVAL by EVAL Company of America, 1001 Warrenville Road, Suite 201, Lisle, Ill. 60632-1359. This product includes 32% ethylene vinyl alcohol with a nominal 4% rutile grade titanium dioxide to provide improved barrier properties with respect to moisture and light as well as oxygen.

The fourth layer 64 functions as an adhesive joining the third layer 63 and fifth layer 65. The adhesive fourth layer 64 preferably has the same composition as the adhesive second layer 62 described above.

The fifth layer 65 is adapted for functioning as the interior side of the package container 30. The fifth layer 65 preferably comprises polypropylene of the same type as in the first layer 61 described above.

In the preferred embodiment, the layers 61–65 in the web or sheet 90 each have a nominal design thickness and design range thickness as set forth in Table I.

TABLE 1

THICKNESS OF CONTAINER SHEET LAYERS

| FIG. 2 Sheet Layer Designation | FIG. 2 Thickness Dimension Designation | Nominal Thickness (Mils) | Design Range Thickness (Mils) |
|---|---|---|---|
| 61 | A | 38.75 | 33.75–43.75 |
| 62 | B | 2.00 | 1.50–2.50 |
| 63 | C | 2.50 | 2.00–3.00 |
| 64 | D | 2.00 | 1.50–2.50 |
| 65 | E | 38.75 | 33.75–43.75 |

When the container 30 is manufactured according to a preferred process described hereinafter, the multi-ply sheet 90 is provided with only the five above-described layers and is devoid of any regrind layer. The sheet 90 preferably has a total thickness, prior to formation into a container 30, ranging between about 72.50 mils and about 95.50 mils.

The structure, composition, and thickness of the sheet 90 provide a superior thermoforming capability and long-term dimensional stability. The multi-ply sheet 90 has a flexural modulus of approximately 160,000 pounds per square inch.

THE CONTAINER

When the sheet 90 is formed into the container 30 (by processes described in detail hereinafter), the container 30 is strong and has superior compression strength. The container 30 is also sufficiently resistant to normal hand squeezing so as to accommodate use of the container for holding typical consumer food products. The container 30 can also withstand significant impact which might be experienced if it is dropped or bumped during routine shipping and handling.

When the container 30 is formed from the multi-ply sheet 90 and has the configuration and dimensions described in detail hereinafter, the container 30 provides good barrier protection with respect to moisture, oxygen, and light. Specifically, moisture transfer through the container 30 (as measured with the container 30 attached to a test fixture in place of the lid 40) is less than or equal to 0.1 gram per day. The oxygen transfer through the container 30 is less than or equal to 0.01 cubic centimeters per day. The light transmission through any portion of the wall of the container 30 is less than or equal to 0.1% for a test light wave length of 450 nanometers.

According to one aspect of the invention, the cup or container 30 is provided with a unique configuration which increases the capability of the container 30 to withstand squeezing and crushing and which can accommodate filling with a product at an elevated temperature without significant deformation.

Figure 3:
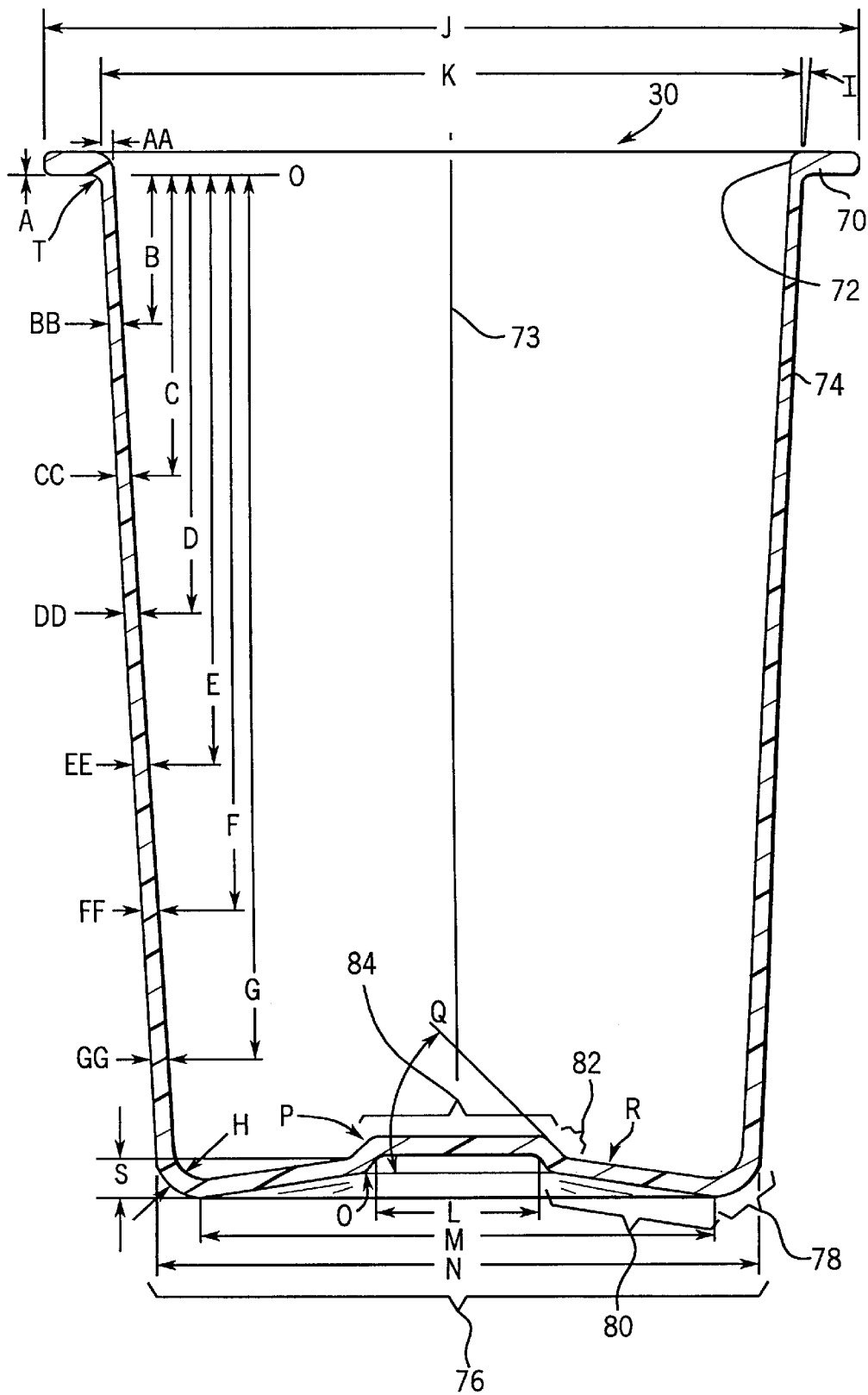
FIG. 3 is a cross-sectional view of the container portion of the package shown in FIG. 1.

FIG. 3 illustrates the cross-sectional configuration of the cup or container 30. The container is preferably formed from the above-described, multi-ply sheet 90. For ease of illustration, the five layers 61–65 of the multi-ply sheet 90 which define the container wall are not individually shown in FIG. 3. Rather, the container wall is illustrated simply as one layer. However, it is to be understood that in the preferred embodiment, the container wall comprises the five-layer sheet 90 described above.

With reference to FIG. 3, it can be seen that the container 30 is a unitary structure having a peripheral flange 70 defining an opening 72. The container 30 includes a downwardly and inwardly tapering hollow body defined around a longitudinal axis 73 by a generally annular sidewall 74 extending from the inner edge of the flange 70.

The container 30 has a bottom end 76. The bottom 76 is defined, in part, by an annular, curved, peripheral base 78 extending from a lower end of the body sidewall 74. The bottom end 76 is adapted to engage a flat support surface along a generally circular line of contact. The base 78 also includes an annular first end wall 80 extending from the annular, curved, peripheral base 78 both inwardly and upwardly toward the opening of the container mouth 72.

The container bottom end 76 also includes an annular, second end wall 82 which is located closer to the opening or mouth 72 than is the first end wall 80. The annular, second end wall 82 extends from the first end wall 80 both inwardly and upwardly toward the container mouth 72. The container bottom end 76 also includes a central, third end wall 84 located closer to the container mouth 72 than is the second end wall 82. The third end wall 84 extends from the second end wall 82 and has a generally circular, disc-like configuration.

In the preferred embodiment, the first end wall 80 defines a substantially frustoconical exterior surface defining an angle of about 79° relative to the longitudinal axis.

Preferably, the thickness of the container sidewall 74 increases with increasing distance from the flange 70 toward the bottom end 76. The thickness of the sidewall 74 at various locations along its height is listed below in TABLE 2 with reference to the FIG. 3 thickness designations AA, BB, CC, DD, EE, FF, and GG. Other dimensions of the container 30, including angular orientations of portions of the container 30, are also set forth in TABLE 2.

TABLE 2

| FIG. 2 Container Dimension Designation | FIG. 2 Nominal Dimension | FIG. 2 Dimension Design Range or Minimum |
|---|---|---|
| A | 0.00 in. | — |
| B | 0.50 in. | — |
| C | 1.00 in. | — |
| D | 7.50 in. | — |
| E | 2.00 in. | — |
| F | 2.50 in. | — |
| G | 3.25 in. | — |
| H | 100 mm. | — |
| I | 3.2 E | 1.8 E–3.2 E |
| J | 76 mm. | — |
| K | 67 mm. | — |
| L | 14 mm. | — |
| M | 46.26 mm. | — |
| N | 55.82 mm. | — |
| O | 0.5 mm. | — |
| P | 0.5 mm. | — |
| Q | 45 E | — |
| R | 0.5 mm. | — |
| S | 4.5 mm. | — |
| T | 0.3 mm. | — |
| U | 5.0 mm. | 3.0 mm.–5.0 mm. |
| AA | 0.010 in. | 0.008 in. minimum |
| BB | 0.010 in. | 0.008 in. minimum |
| CC | 0.010 in. | 0.008 in. minimum |
| DD | 0.011 in. | 0.008 in. minimum |
| EE | 0.012 in. | 0.008 in. minimum |
| FF | 0.014 in. | 0.010 in. minimum |
| GG | 0.020 in. | 0.015 in. minimum |
| HH | 0.016 in. | 0.012 in. minimum |

The preferred embodiment of the container 30 incorporating the dimensions set forth in FIG. 2 can withstand top loading forces of a magnitude normally encountered when the containers are stacked in sales displays as well as when the containers are stacked during manufacturing, packing, and distribution. The configuration of the container base 78 and bottom corner of the container 30 provides a compression strength which is sufficient to prevent corner crushing under loads that are normally encountered. The steep angle of the container wall 74, and the change in thickness of the wall 74 relative to the wall height, contribute to providing compression strength sufficient to accommodate compression loads that are normally encountered. However, the angle of the wall 74 is sufficient to facilitate removal of the container 30 from an exterior forming die (during a forming process described hereinafter in detail).

The configuration of the container bottom end 76 concentrates the container material in those regions where it is desired to have additional rigidity so as to withstand the weight load of a product dispensed into the container, especially while the container is still warm from the thermoforming process preferably used to make the container. The container bottom end configuration resists the tendency of the container material to deform under a load, especially when the material is warm, thereby preventing the formation of an outwardly convex deformation or bulge ("rocker bottom") which could make the container base or bottom unstable.

THE PACKAGE LID

The above-described, improved container 30 is particularly well-suited for use in the sealed package 20 which includes the lid 40. The lid 40 is heat-sealed in a unique manner to the top of the container flange 70. The lid 40 may be made from a suitable conventional or special material that can be heat-sealed, at least in a region on the container flange 70. In a preferred embodiment, the lid material is a multi-ply material having a conventional layered or laminated structure. A presently preferred commercial lid material is sold under the designation Safe-Gard™ Y-523 Top Tabbed Induction Innerseal by 3M Company, St. Paul, Minn. 55144-1000, U.S.A.

Figure 4:
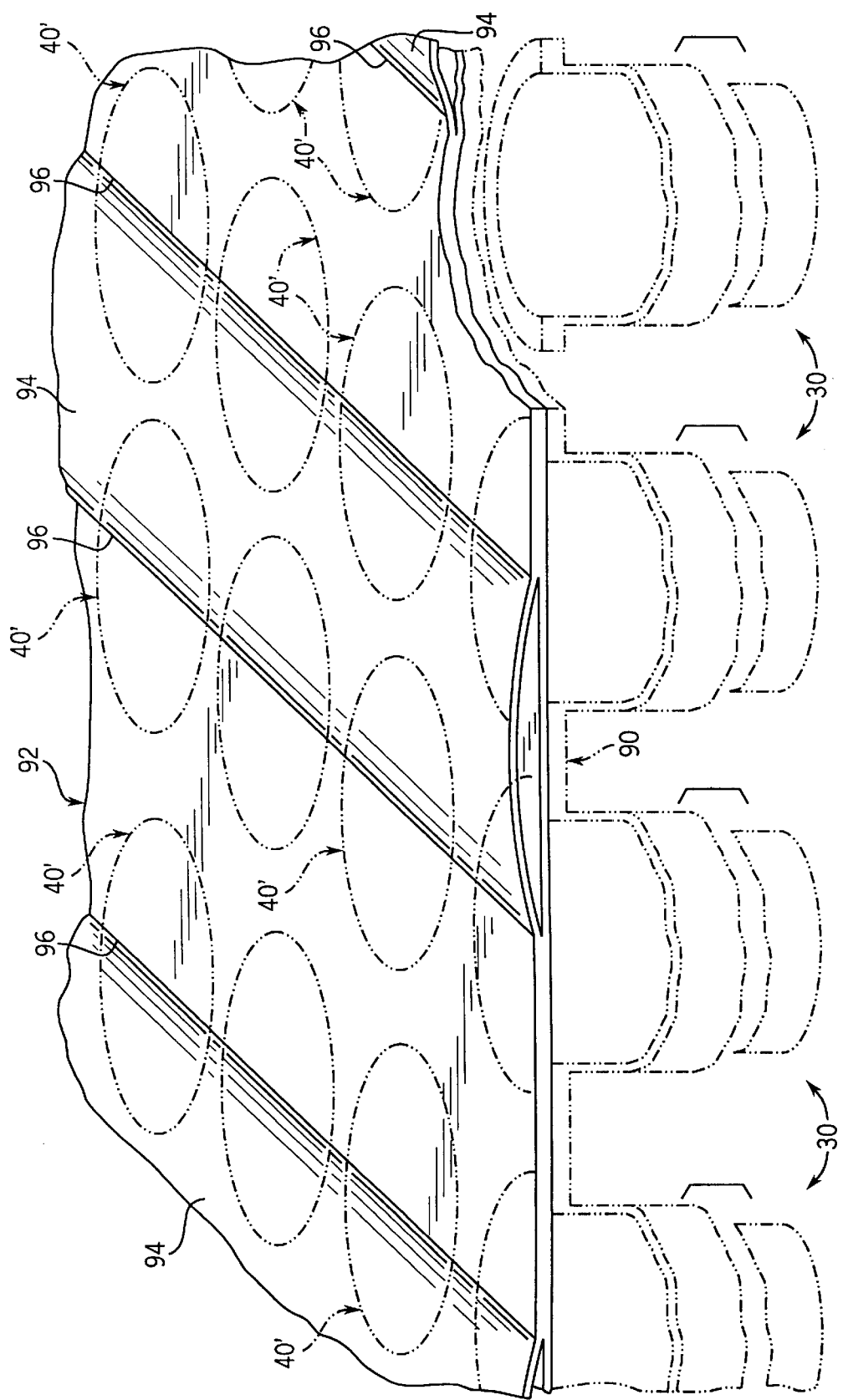
FIG. 4 is a fragmentary, perspective view of sheet material undergoing a forming step in accordance with the present invention.

The Safe-Gard™ material for the lid 40 is preferably provided in the form of a wide web or sheet in a roll. FIG. 4 illustrates such a wide sheet 92 of the lid material shown disposed in a flat, horizontal orientation over a plurality of containers 30 formed in, and still connected to the above-described web or sheet 90. The areas of the lid sheet 92 which will each ultimately become separate lids 40 on each container 30 are shown in phantom in FIG. 4 and are designated therein by the reference numeral 40'.

One or more top plies or layers of the lid sheet 92 are not laminated to the underlying plies in spaced-apart, strip regions 94 (FIG. 4). The parallel, spaced-apart, strip regions 94 are connected to the rest of the sheet 92 along, and beyond, lateral margins 96. Each strip region 94 is not connected to the underlying portion of the sheet 92 between its two lateral margins 96.

When the lid sheet 92 is disposed over the tops of the containers 30 prior to sealing the sheet 92 to the containers, preferably, substantially one-half of the top of each container 30 extends under a strip region 94, and the other half of the container extends under the adjacent, fully laminated plies of the lid sheet 92. After the sheet 92 is sealed to the tops of the containers 30 (by a process described in detail hereinafter), the individual lid regions 40' are punched out from the remaining portions of the lid sheet 92 along with the individual containers 30 which at the same time are separated from the remaining portion of the container sheet stock 90 by the same punching process. The punching process creates the hinged, substantially semi-circular tab 42 (FIG. 1) over one-half of the lid 40, and the tab 42 is hinged to lid 40 along one of the lateral margins 96 of the lid sheet strip region 94 FIG. 4).

Figure 5:
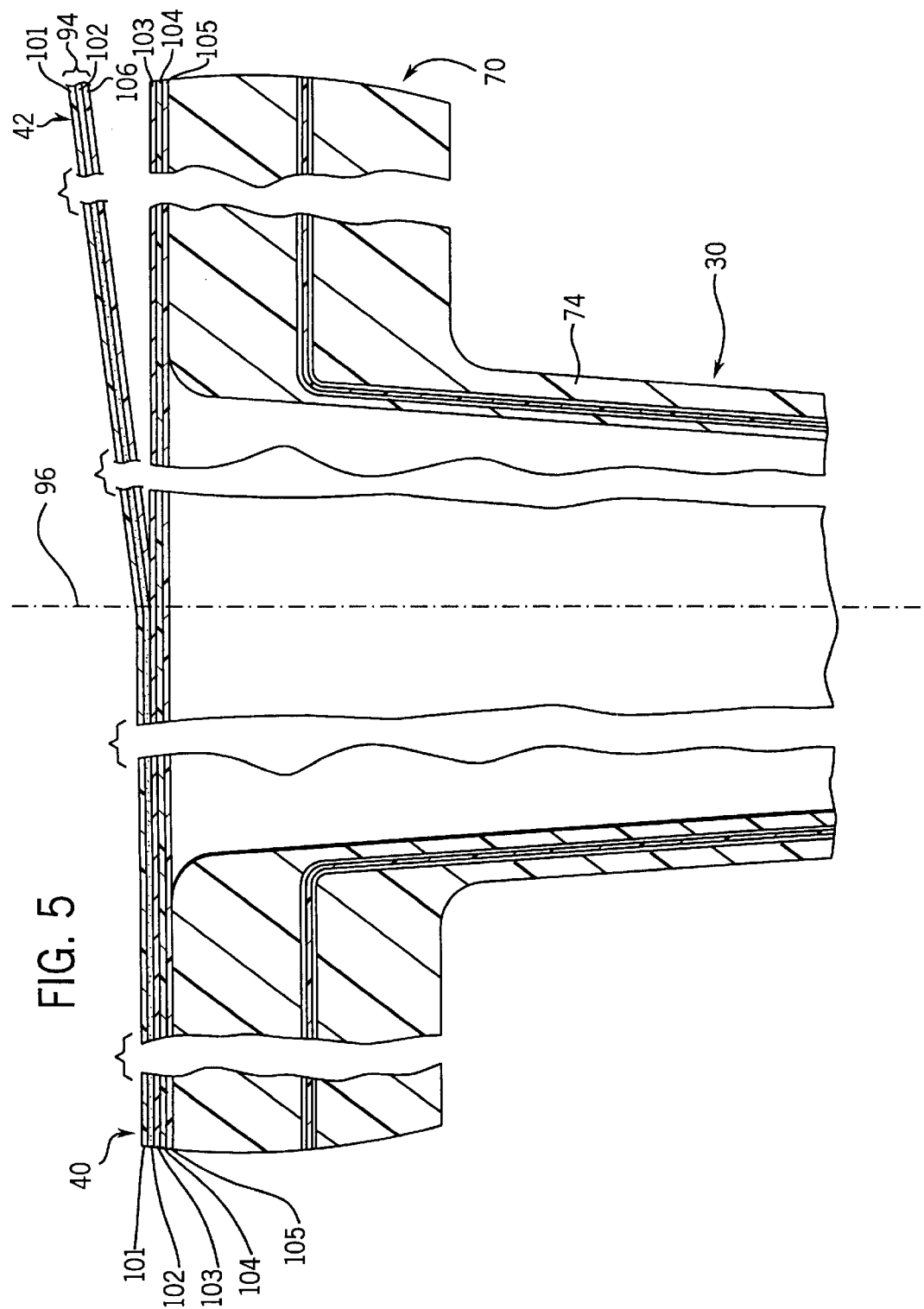
FIG. 5 is a greatly enlarged, fragmentary, cross-sectional view taken generally along the plane five—five in FIG. 1.

The multi-ply structure of each individual lid 40 is illustrated in FIG. 5. When the above-identified Safe-Gard™ Y-523 material is used for the lid 40, the lid 40 has a top layer 101, a second layer 102, a third layer 103, a fourth layer 104, and a fifth layer 105. An extra layer 106 is also provided on the underside of the tab 42. The extra layer 106 is not attached to the underlying layer 103. The semi-circular tab 42 is attached to the lid 40 along its diameter (across the diameter of the container 30) at the lateral margin 96 (which is part of one of the same lateral margins 96 of one of the strip region 94 in lid sheet 92 (FIG. 4).

The layers 101–106 of the above-identified Safe-Gard™ Y-523 lid material have the compositions and thicknesses as set forth in TABLE 3 below.

TABLE 3

| Lid Layer Designation In FIG. 3 | Lid Layer Composition | Lid Layer Nominal Thickness |
| --- | --- | --- |
| 101 | Polyester Film | 0.0008 in. |
| 102 | Co-polymer Adhesive | 0.0032 in. |
| 103 | Minimum Foil | 0.0010 in. |
| 104 | Polyester Film | 0.00056 in. |
| 105 | Heat Sealable Film | 0.0012 in. |
| 106 | Polyester Film (present only on underside of tab 42 and adhered to polyester top film layer 101) | 0.0015 in. |

The heat-sealable film layer 105 may be a heat-sealable film sold in the U.S.A. under the designation PEELEX by Lawson Mardon.

The overall thickness of the multi-ply lid 40, in the preferred embodiment, is about 0.0072 inch, plus/minus 0.0005 inch.

THE PACKAGE LID SEAL

The lid 40 is sealed to the container flange 70 in a process performed by an apparatus described in detail hereinafter. The seal formed between the lid 40 and the container flange 70 has a unique configuration which provides improved attachment and sealing characteristics.

Figure 6:
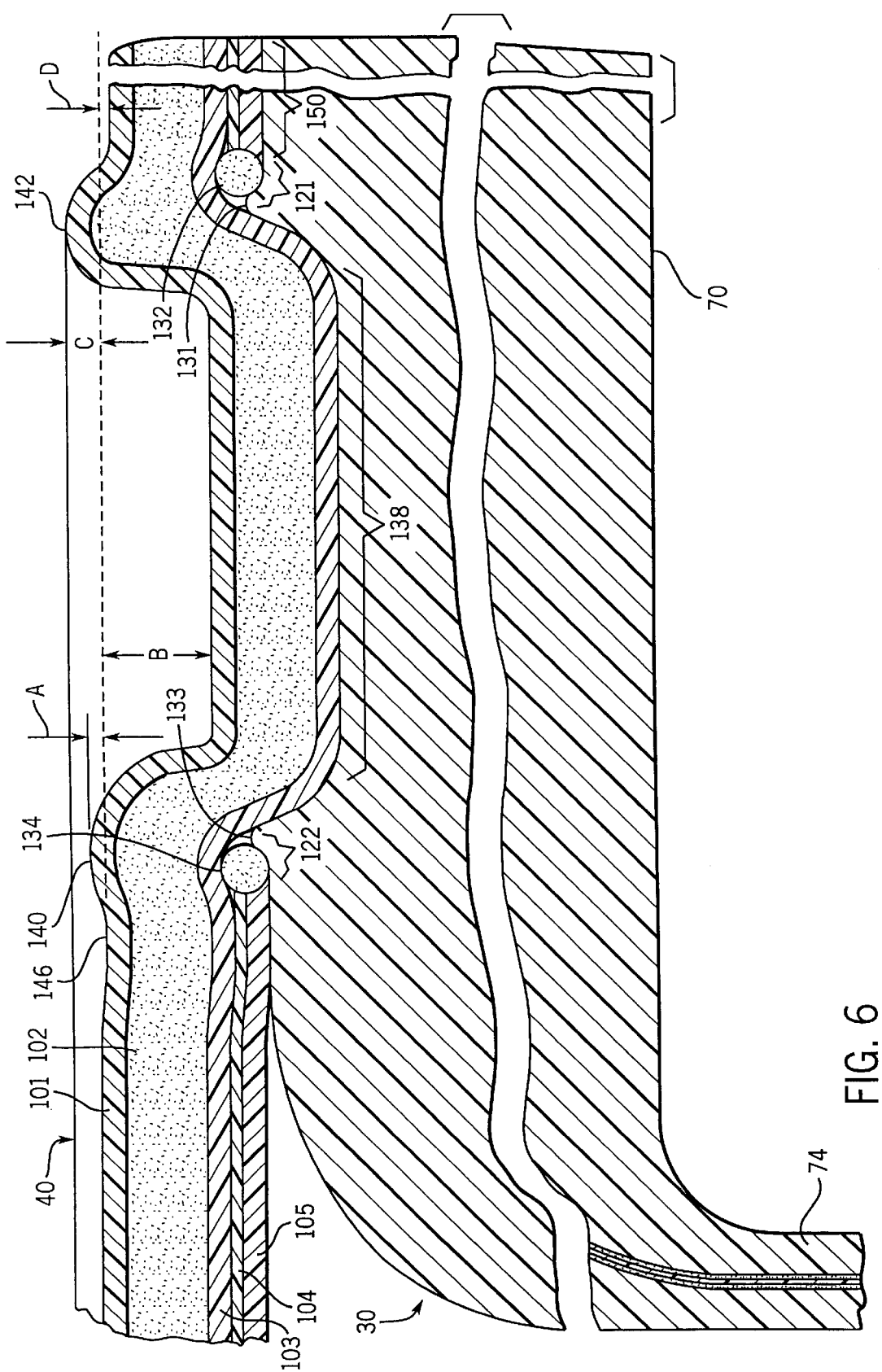
FIG. 6 is a greatly enlarged, fragmentary, cross-sectional view taken generally along the plane 6—6 in FIG. 1.

FIG. 6 illustrates the attachment of the lid 40 to the container flange in the half of the lid that is not under the loose tab 42. FIG. 6 is a somewhat simplified illustration, and portions of FIG. 6 are depicted as being disproportionately larger or smaller than other portions for clarity of illustration.

A relatively strong annular bond is formed at a first heat seal 121. The heat seal 121 comprises a resolidification of a melted interface portion of the lid 40 and flange 70.

In particular, the flange 70 has an annular, upset, first bead 131 which projects slightly above the rest of the upper surface of the flange 70. The annular bead 131 is formed during the lid heat sealing process described in detail hereinafter.

Adjacent the first bead 131, and radially outwardly thereof, is a second bead 132 which is formed from fusion of the lid layer 105 and lid layer 104. The layers 105 and 104 which initially extend across the entire bottom of the lid sheet material are deformed and squeezed during the heat sealing process (described in detail hereinafter) such that some of the material of the layers 105 and 104 radially inwardly of the flange bead 131 is displaced laterally and forms the bead 132.

The beads 131 and 132 are heat sealed together at the heat seal 121. The heat seal 121 comprises a resolidification of a melted interface portion of the lid second bead 132 and the flange first bead 131.

An annular, second heat seal 122 is formed inwardly of the first heat seal 121. The second heat seal 122 is defined between an annular, upset third bead 133 on the flange 70 and an annular fourth bead 134 in the lid 40. The lid fourth bead 134 is formed during the heat sealing process described hereinafter wherein some of the material of the lid layers 105 and 104 is squeezed and displaced rdidally inwardly. During the heat sealing process, the annular, upset third bead 133 is formed on the flange 70. The second heat seal 122 comprises a resolidification of a melted interface portion of the flange third bead 133 and lid fourth bead 134.

When the heat seals 121 and 122 are formed by the process described in detail hereinafter, the displacement of the material from the bottom layers 105 and 104 to form the lid beads 132 and 134 results in the elimination, or at least substantial reduction, of the layers 105 and 104 from the annular region 138 which is defined between the two lid beads 132 and 134. In the region 138, the foil layer 103 substantially contacts the container flange material but does not form a significantly strong heat seal bond with the flange material. The region 138 is defined by a recessed area in the lid material, and some of the lid material is laterally deformed outwardly to form the upset beads 131 and 133 at the recess outer edge and recess inner edge, respectively.

The heat sealed inner beads 133 and 134 necessarily cause a bulge or slight upward projection 140 at the top surface of the material of the lid 40. Similarly, the heat sealed outer beads 131 and 132 cause the upper surface of the material of the lid 40 to project slightly outwardly at 142.

Radially inwardly from the lid bead 134 there is little or no significant attachment of the lid 40 to the underlying flange 70. The lid 40 in that region is thus free to be flexed slightly upwardly from the upper surface of the flange 70, depending upon the forces acting on the lid 40 from either inside the container or outside the container and depending upon the degree of tension existing in the lid 40 across the diameter of the inner seal 122.

The top surface of the lid 40 immediately adjacent, but radially inwardly of, the projection 140 is designated in FIG. 6 by the reference number 146. The height of the lid exterior surface at location 146 is equal to the thickness of the lid material where it contacts the surface of the container flange 70 just radially inwardly of the inner, annular seal 122. The surface of the lid 40 at the top of the projection 140 may be a small distance A above the surface 146.

Outwardly of the projection 140, the lid material is recessed below the surface 146 by the amount indicated by the reference letter B.

The outer projection 142 at the top of the lid 40 may project above the surface 146 by a small amount indicated by the reference letter C. Radially outwardly of the projection 142, the upper surface of the lid 40 may be slightly depressed by an amount designated with the reference letter D. However, there may be only a very slight depression, or no depression, of the outer portion of the lid so that D may be zero or close to zero.

At the bottom surface of the lid 40 outwardly of the outer seal 121, the lid 40 may be lightly attached or "tacked" by a heat bond to the top surface of the container flange 70 as indicated by the region 150 in FIG. 6.

FIG. 6 illustrates the container flange 70 sealed to a portion of the half of the lid 40 which includes all five layers laminated together. The other half of the lid 40, under the lift-off tab 42, would only have the bottom three layers 103, 104, and 105 laminated together and sealed to the lid flange 70 (compare with FIG. 5). Because the lid 40 is sealed to the container flange 70 with the tab 42 flat against the underlying lid portion, the tab 42 also bears the heat seal imprint of the heat seal tool (described hereinafter in detail). However, after the sealed package 20 is punched out of the lid sheet 92 and container sheet 90, the lid tab 42 is free to pivot upwardly from the lid about the tab hinge 96.

The seal of the container flange 70 to the laminated three-layer half of the lid 40 under the tab 42 has a profile substantially similar to that illustrated in FIG. 6 except that the top two layers 101 and 102 shown in FIG. 6 are in the hinged tab 42. The lid seal structure underlying that tab 42 has the following configuration: (1) a recessed region (similar to region 138 in FIG. 6), (2) flange beads (similar to beads 131 and 133 in FIG. 6), (3) lid beads (similar to beads 132 and 134 in FIG. 6), and (4) lid projections (similar to projections 140 and 142 in FIG. 6). However, the overall thickness of the lid 40 in the area under the tab 42 is thinner by an amount equal to the thickness of the layers 101 and 102.

To assist in opening the lid 40, the above-described lid seal structure preferably has two small areas at the outer edge of the lid which differ slightly from the remaining annular portion of the seal structure. These two areas are identified in FIG. 16 with dashed lines and are designated by reference number 151.

The two areas 151 are 180 degrees apart on the ends of the lid diameter hinge line 96 which connects the tab 42 to the lid 40. The two areas 151 have a weaker bond or tacking attachment of the lid 40 to the container flange 70 than exists around the remaining peripheral edge portions beyond the two areas 151.

It will be recalled that the lid 40 was previously described as being only lightly bonded to the container flange 70 in the outermost, annular region 150 shown in FIG. 6. However, the two areas 151 in the annular region 150 represent an even weaker bond or no bond at all. The areas 151 do not extend radially inwardly so far that they affect the outer, full heat seal 121 (FIG. 6).

Figure 16:
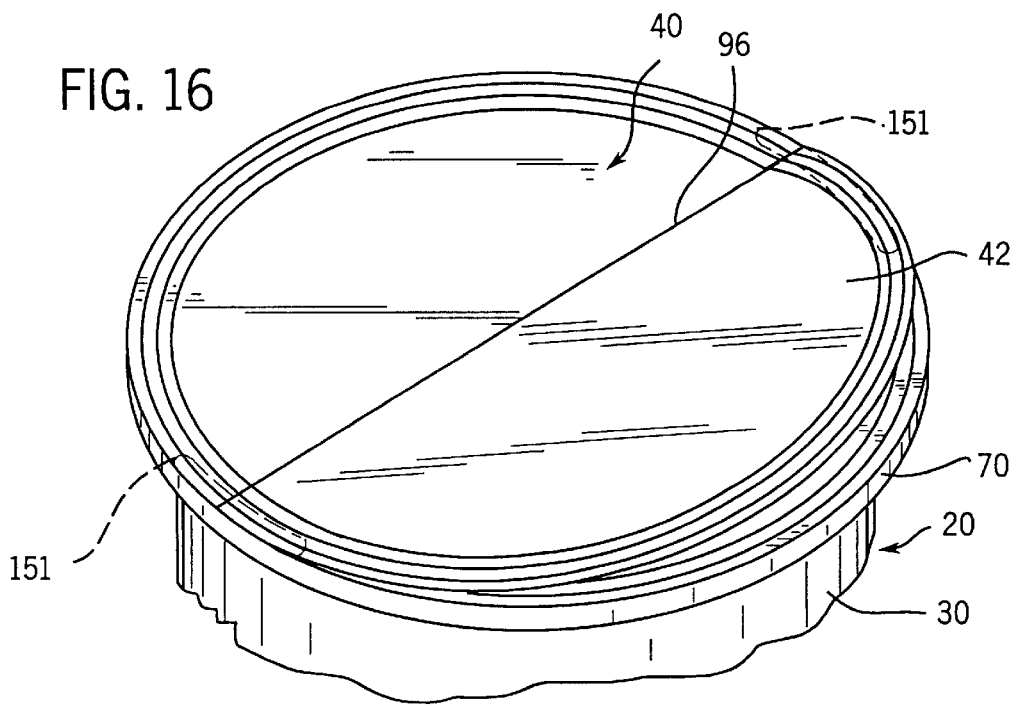
FIG. 16 is a fragmentary perspective view of the top of the package shown in FIG. 1.
Figure 17:
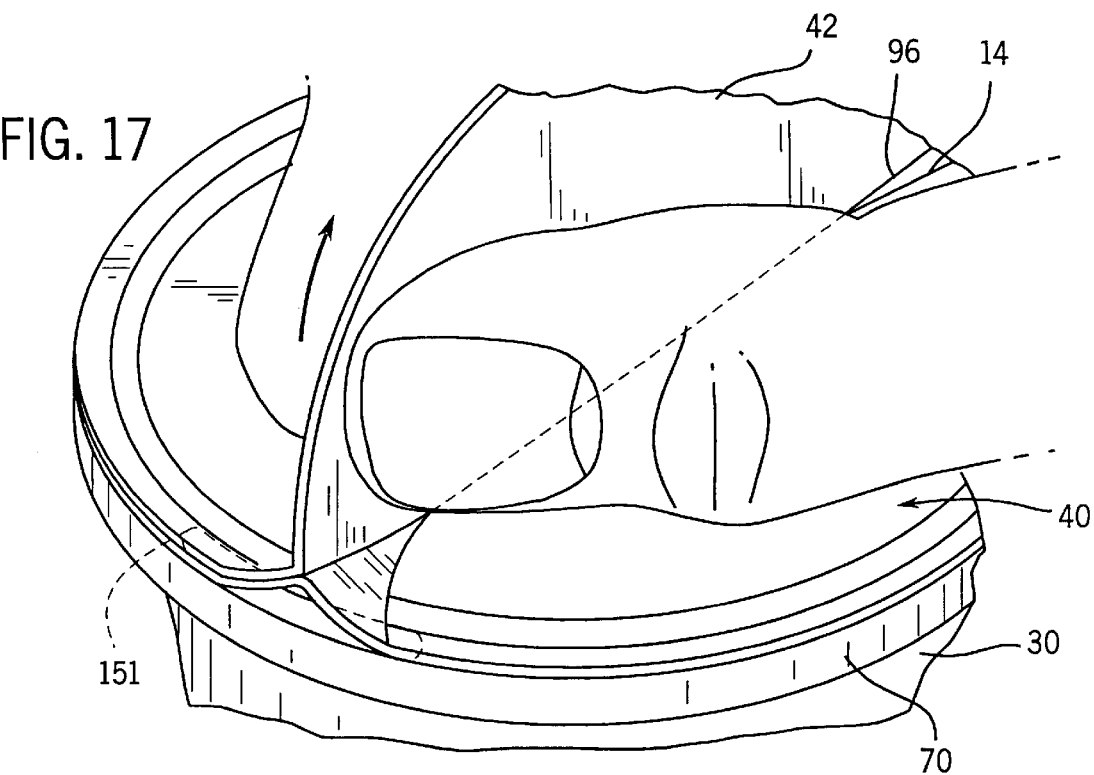
FIG. 17 is a view similar to FIG. 16, but FIG. 17 shows the package tab being grasped to open the lid.

The relatively weak bond (or bond-free) areas 151 facilitate the opening of the lid 40 when the tab 42 is pulled upwardly as shown in FIG. 16. Because the areas 151 at each peripheral end edge of the tab hinge connection 96 have no bond or a relatively weak bond between the lid 40 and container flange 70, the lid 40 can be initially pulled away more easily in the areas 151 compared to the remaining areas of the periphery of the cup. FIG. 17 shows how the lid 40 is initially and preferentially pulled away from the container flange 70 in a tent-like configuration at one of the areas 151 when the tab 42 is pulled upwardly. This provides a means by which the opening of the lid 40 can be readily started so that continued pulling on the tab 42 will then open the full heat seals 121 and 122 (FIG. 6) whereby the lid 40 becomes completely detached.

The novel lid seal structure described above provides a number of desirable characteristics and advantages. The above-described heat seal bead structure, such as the heat seal 121 of the flange bead 131 to the lid bead 132 and/or the heat seal 122 of the flange bead 133 to the lid bead 134, provides a high-strength attachment and a highly effective, leak-tight seal which has a relatively high burst strength. The seals 121 and 122 are less likely to fail when the package is subjected to impacts and/or pressure gradients.

Further, it has been found that the above-described seal structure is effective in preventing, or substantially minimizing, wrinkling of the lid material. In particular, after the lid sheet material is heat-sealed to the containers, the lid material is permitted to cool. In some cases, there may be a tendency of the lid material to contract and/or produce wrinkles across a portion of the lid. This may result in the formation of channels through the seal area which would function as leakage passages. The above-described new seal configuration of the present invention eliminates such wrinkles, or at least minimizes such wrinkles to the extent that leakage passages or channels do not develop in the seal.

It should also be noted that the width of the annular recess 138, along with the radially outwardly extending, lightly heat-bonded region 150, provides a large area which is heated with the heat-sealing tool during the heat-sealing process described hereinafter. The large, heated area permits sufficient heat to be added to the lid and flange materials so that properly formed, strong heat seals are created with the desired configuration.

It will also be appreciated that the novel heat seal configuration of the present invention, while providing a high-strength, hermetic seal, also permits the lid to be relatively easily removed by the user when the user pulls on the tab 42.

THE COMPLETED PACKAGE

The above-described heat seal of the present invention which bonds the lid 40 to the container 30 contributes to the strength of the completed package 20 so as to effectively contain and protect the product therein. The preferred embodiment of the package 20 provides a minimum of 60 pounds compression strength as measured by a test based upon ASTM D695. This is sufficient to withstand the postulated maximum crushing load to which the package 20 might typically be subjected during distribution and handling.

The package 20, when fabricated from the above-described preferred materials, offers sufficient barrier protection with respect to moisture, oxygen, and light for many contemplated packaging applications.

Further, the exterior surfaces of the package 20 are relatively resistant to tearing, scratching, abrasion, puncturing, etc.

Also, the exterior surfaces of the package exhibit, or can be provided with, surface finishes and/or coatings which would provide a pleasing aesthetic appearance or other special appearance.

METHOD AND APPARATUS FOR MAKING THE PACKAGE

General Arrangement Of The Apparatus

Figure 7:
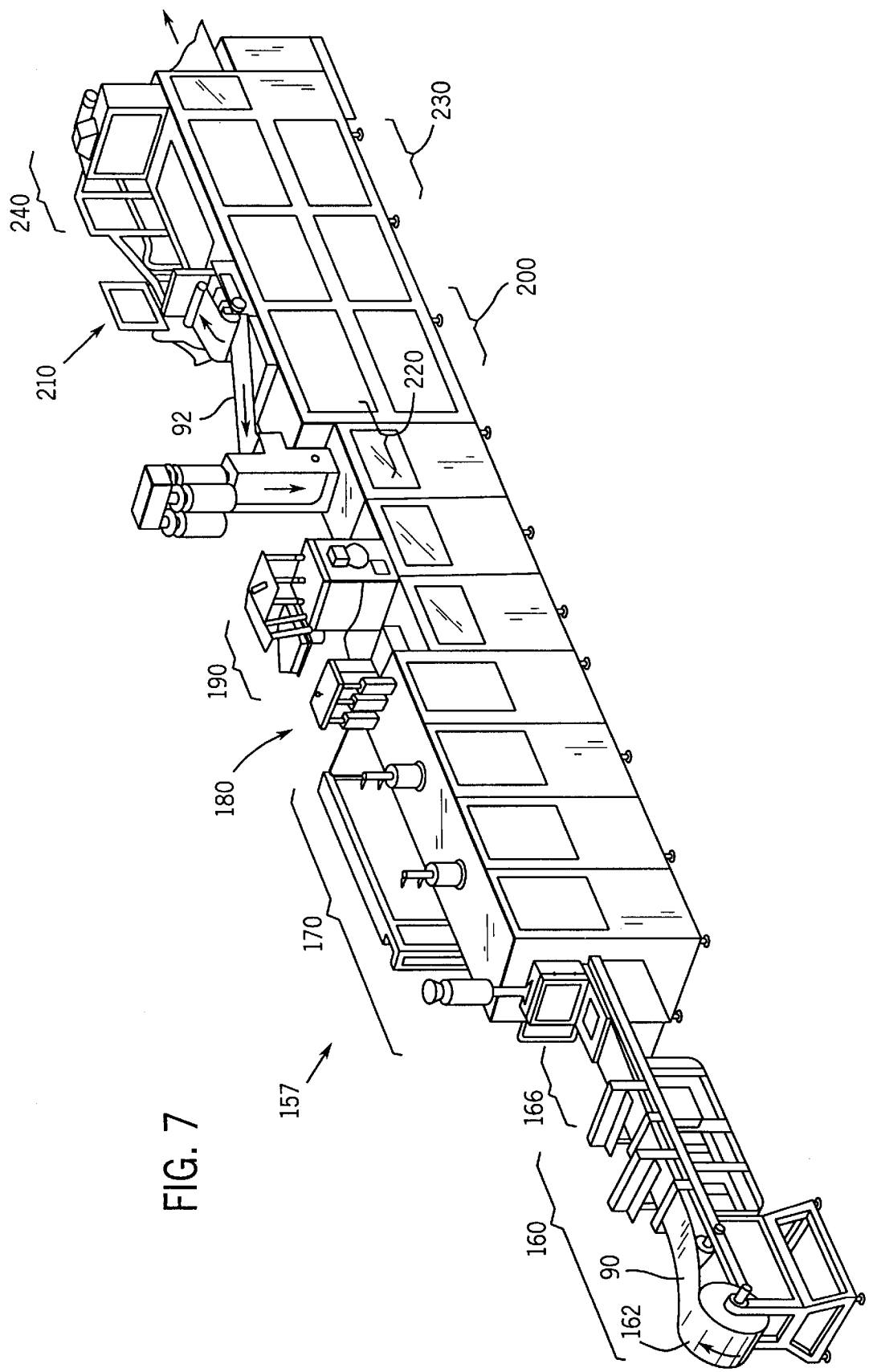
FIG. 7 is a simplified, perspective view of a conventional machine which can be modified to incorporate features of the present invention.

Referring now to the drawings, the general arrangement and sequence of operation of an apparatus for making the package 20 can be best understood with reference to FIG. 7. FIG. 7 illustrates a packaging machine 157 that has certain components that can be modified and/or replaced in accordance with the teachings of various aspects of the present invention to produce the above-described package 20. An example of a machine 157 is sold in the U.S.A. under the model designation TFA 7033 by Robert Bosch Corporation, 121 Corporate Blvd., South Plainfield, N.J., U.S.A., 07080.

The machine 157 includes a spool support and feeding station 160. In the station 160, the container or cup sheet 90 is drawn from a spool or roll 162. The cup sheet 90 is processed by the machine 157 so as to thermoform the cups 30, fill the formed cups 30, heat-seal the lid sheet 92 to the cups 30, and then die-cut the sealed lid/cup package from the lid and cup sheets.

Typically, the machine 157 is operated to initially perform a series of self-cleaning steps using a combination of hydrogen peroxide, sterile air, and/or steam to insure that a sterile environment is maintained within the machine.

The cup or container sheet 90 is drawn from the feeding station 160 through a hydrogen peroxide bath station 166 so as to sterilize the sheet 90.

The sheet 90 then passes into a sterile or aseptic zone in the machine which includes a heating station 170. The heating station 170 comprises eight heating substations of equal width. The sheet 90 is incrementally advanced or indexed through the machine 157. During each indexed advancement of the sheet 90, the sheet moves a distance equal to the centerline spacing between adjacent heating substations.

In each heating substation, there are twenty-four areas of the sheet 90 which are heated by direct contact of both side surfaces of the sheet with twenty-four heating pads on each side surface as to raise the temperature of each area of the sheet 90. The temperature of each of the twenty-four areas of the sheet 90 increases as the sheet 90 is incrementally indexed through each of the eight heating substations. Each heating substation is designed to heat the twenty-four areas on the sheet 90 for accommodating subsequent thermoforming of twenty-four containers simultaneously. The twenty-four areas on the sheet 90 in each of the eight heating substations are contacted directly by twenty-four top surface heating pads and twenty-four bottom surface heating pads arranged in an array of six rows of pads across the width of the machine ("transverse direction") and four pads in each row along the length of the machine ("machine direction").

The heated sheet 90 leaves the heating station 170 and enters the thermoforming station 180. In the thermoforming station 180, the heated sheet is deformed by twenty-four reciprocally moving plugs that force portions of the heated sheet downwardly into corresponding die cavities. A short blast of sterile, compressed air is simultaneously injected over the top surface of the sheet 90 to blow the sheet away from the plugs and against the die cavities to form the containers or cups. The forming plugs are reciprocally moved upwardly and way from the formed containers. The forming plugs are preferably water-cooled to prevent overheating.

The formed cups leave the thermoforming station 180 as projections extending downwardly from the remaining flat portions of the sheet 90. The cups then enter the filling station 190. In the filling station 190, nozzles are lowered into each cup to deliver a sterilized product into each cup. The product is typically a fluid, and can be dispensed from a large holding tank by means of a conventional slide wall piston filling mechanism or other known means for delivering a fluid from a holding tank to a nozzle.

Lowering of the filling nozzles into each cup minimizes the drop height of the product during filling which eliminates product splash and after-drip. This also minimizes foaming and facilitates more effective sealing of the lid to the cup owing to the elimination or minimization of contamination on the cup flange sealing surface.

After the cups are filled, they are indexed with the sheet 90 to the lid sealing station 200. Here the lid sheet 92 is sealed to the cups. The lid sheet 92 is drawn from a roll 210 rearwardly over the top of the sealing station 200 and then down through a hydrogen peroxide sterilizing bath in a lid sheet sterilizing station 220 prior to being indexed through the sealing station 200 above the cups formed in the sheet 90.

The cups entering the sealing station 200 leave the preceding sterile zone of the machine through a discharge lock, and twenty-four cups are simultaneously sealed to the overlying lid sheet 92 with twenty-four individual heat seal tools in sealing station 200. Index groupers are used to prevent product spillage from the containers advancing through the sealing station 200.

At the sealing station, the lid sheet 92 is sealed tightly to the rim or flange of each cup. The sealed assembly is immediately cooled to minimize warpage.

The formed, filled, and sealed assembly is then indexed to a die-cutting or trim station 230. Twenty-four punch and die tool sets are operated in the trim station 230 to separate the sealed cup and lid package from the remaining web portions of the lid sheet 92 and container sheet 90. Typically, a motor control system is utilized to continually adjust the registration of the punch and die sets to compensate for any variation due to sheet shrinkage during processing.

The die-cut remaining portion or matrix of the lid sheet 92 and container sheet 90 is accumulated on a winder in a scrap discharge station 240 where it is chopped into strips and discharged onto a conveyor belt for recycling.

The finished packages are transported to a secondary packaging area by means of a walking beam transport system. This insures accurate indexing for any subsequent processing steps, such as boxing.

The machine of the present invention operates at about eighteen indexing cycles per minute where each indexing cycle is defined as comprising the stationary dwell of the sheet at a station while the station operates on the sheet plus the sheet advancement from one station to the next.

The aspects of the present invention which involve modifications to the machine are described in detail hereinafter. The conventional mechanisms and elements of the machine which are not modified according to the present invention either are not described herein in detail or are described herein only in sufficient detail so as to afford an understanding of the relationship to the teachings of the present invention. The details of the design and operation of such unmodified, conventional elements of the machine 157 form no part of the present invention.

Improved Container Sheet Heating Process And Apparatus

The machine heating station 170 raises the temperature of groups of twenty-four areas the container sheet 90 so that they may be subsequently formed into twenty-four container or cup bodies. According to one aspect of the invention, some of the sheet contact-heating elements are arranged in specific configurations and groupings so as to permit improved control of the sheet temperature. According to another aspect of the invention, each container sheet contact-heating surface has a special configuration which accommodates potential misalignment of the sheet as it is indexed through the machine.

Specifically, as shown in FIG. 8, the heating station 170 includes eight heating substations 271, 272, 273, 274, 275, 276, and 278. The heating substations 271–278 each include upper and lower heating plates for contacting the top and bottom surfaces, respectively, of the cup sheet 90. There is one upper heating plate in each heating substation. That is, the heating substations 271, 272, 273, 274, 275, 276, 277, and 278 each have a single, upper heating plate 281, 282, 283, 284, 285, 286, 287, and 288, respectively.

Beneath the sheet 90, each of the heating substations 271–278 includes a two or more bottom heating plates arranged across the width of the sheet 90 to define a group (group 301 in heating substation 271, group 302 in heating substation 272, group 303 in heating substation 273, group 304 in heating substation 274, group 305 in heating substation 275, group 306 in heating substation 276, group 307 in heating substation 277, and group 308 in heating substation 278).

FIG. 9 is a simplified schematic illustration of the heating station 170 which includes the eight heating substations 271–278 comprising the upper heating plates 281–288, respectively, and the bottom heating plate groups 301–308, respectively.

The upper heating plates 281–284 are moved upwardly and downwardly by a suitable hydraulic piston/cylinder actuator 310. The upper heating plates 285–288 are similarly moved upwardly and downwardly by an actuator 312. Actuators 314 and 316 are employed to extend and retract the lower heating plate groups 301–304 and 305–308, respectively.

When the upper and lower heating plates are extended to contact the container sheet 90, twenty-four areas of the sheet are heated. In order to heat the sheet 90 sufficiently as it is indexed through the machine, the sheet is sequentially heated at each of the heating substations 181–188. The thermal energy of the sheet 90 thus increases as the sheet 90 is indexed through the heating station 170. If the sheet 90 has the composition and structure of the preferred embodiment described above with reference to FIG. 2, then the heating station 170 preferably functions to heat the twenty-four areas of the sheet 90 to a final temperature in the range of between about 160° C. and about 167° C.

As shown in FIG. 9, each upper heating plate 281–288 has twenty-four heating pads 400 arranged as shown in FIG. 9. The heating pads 400 are arranged on each plate 281–288 in six rows oriented lengthwise along the length of the machine 157 in the feed direction of the container sheet 90. Each of the six rows has four heating pads 400. The six rows are arranged in pairs, and the spacing between adjacent pairs is slightly greater than the spacing between the two adjacent rows in each pair. This is necessary to ensure proper alignment relative to the strip regions 94 in the lid sheet 92 and to the wider spacing between the strip regions 94 in the lid sheet 92 (see FIG. 4).

Figure 9A:
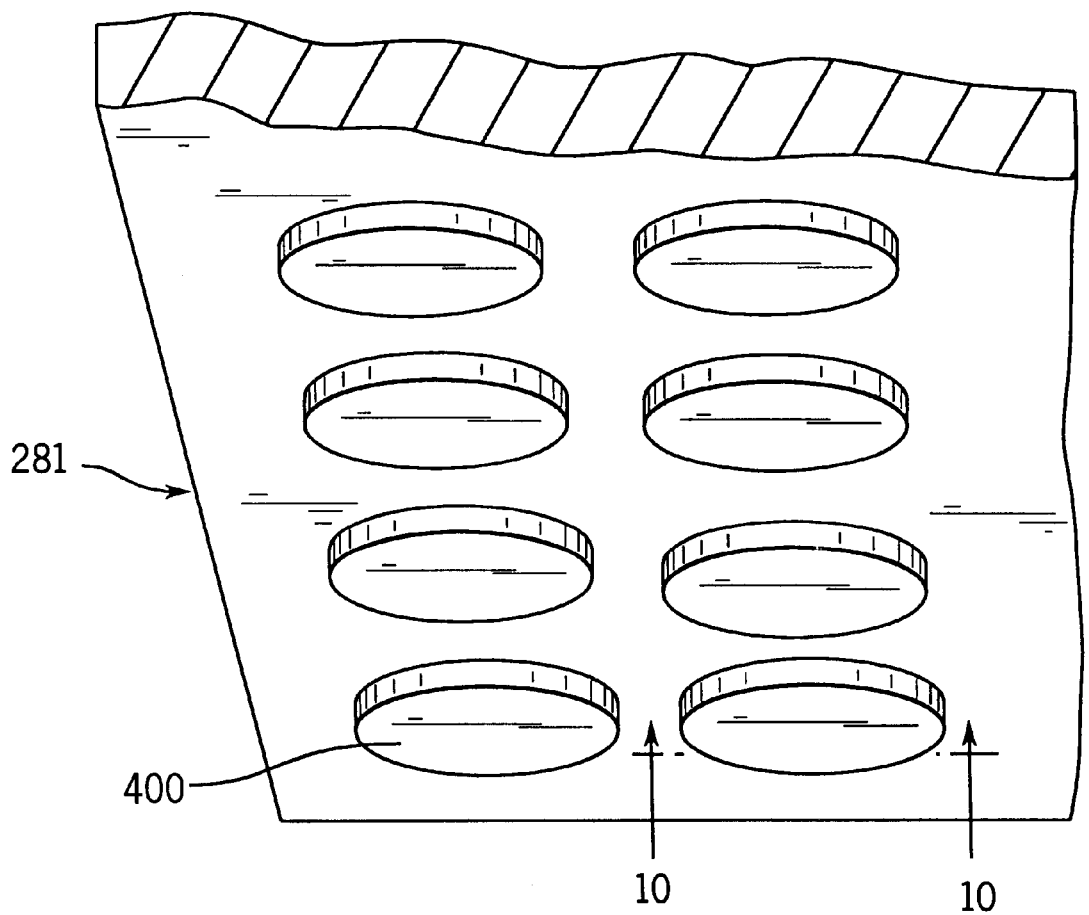
FIG. 9A is a fragmentary, perspective view of a modified heating plate of the present invention.
Figure 10:
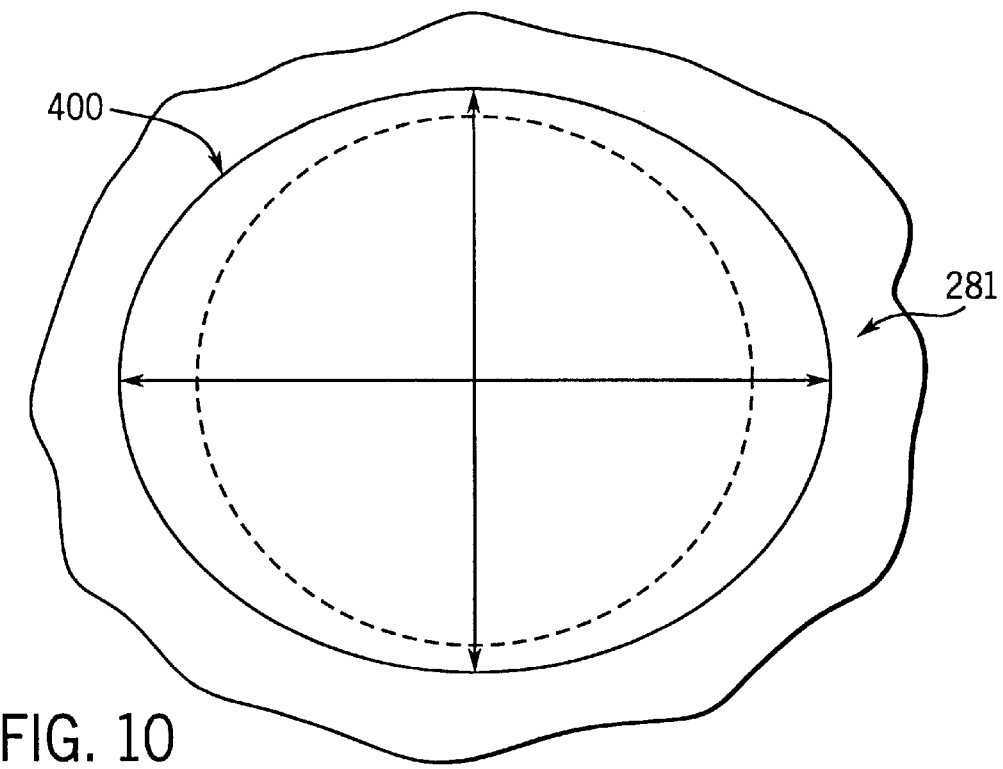
FIG. 10 is a fragmentary, plan view taken generally along the plane 10—10 in FIG. 9A.

As illustrated in FIGS. 9A and 10, each pad 400 has an oval configuration. Each pad is preferably formed as a unitary part of the associated plate and projects outwardly from the surface of the plate. Each pad has the same size and configuration. The minor axis of the oval is larger than the diameter of the largest transverse section of the portion of the container to be thermoformed (i.e., larger than the diameter of the container body wall 74 (FIG. 1)). The pads 400 are oriented with the axis of the major diameter aligned in the machine direction (i.e., parallel to the advancement direction of the container sheet 90 through the machine 157).

The oval configuration of each heating pad 400 results in the heating of a larger area of the sheet which is to be formed into a container (by the thermoforming process as described in detail hereinafter). The larger area, especially along the major axis of the oval configuration, accommodates some misalignment of the container sheet 90 as it is indexed to advance through the machine 157. However, even the minor axis dimension of the oval is preferably larger than the outside diameter of the container body wall 74 that is to be thermoformed, and thus the oval configuration of each heating pad 400 also accommodates some transverse misalignment of the sheet 90. Consequently, even though the sheet 90 may be misaligned as it advances through the machine 157, a sufficiently large area of the sheet 90 is heated for thermoforming each container so that the container can be formed anywhere within that larger oval area (which is at the desired, elevated temperature necessary for proper container formation). In the preferred embodiment where it is intended for the container 30 to have the structure and dimensions described above with reference to TABLE 2, the pad major axis is 79 mm., and the pad minor axis is 75 mm.

The bottom heating plate groups 301–308 are schematically illustrated in FIG. 9. The lower heating plate group 301 at the upstream end of the heating station 170 has a back plate 301B and a front plate 301F arranged transversely across the sheet processing path of the machine 157 in registry below the overlying top heating plate 381. Each plate 301B and 301F includes twelve oval pads 400 arranged in three rows of four pads 400 each. The three rows are aligned along, and parallel with, the sheet processing path. The transverse or lateral spacings between the rows of pads 400 correspond to, or match, the transverse spacings of the rows of pads 400 in the top heating plate 181.

The next downstream bottom heating plate group 302 is identical with the above-described bottom heating plate group 301, and the group 302 includes a back heating plate 302B and a front heating plate 302F.

The next heating plate group 303 is also identical with the first bottom heating plate group 301, and the group 303 includes a back heating plate 303B and a front heating plate 303F.

The next bottom heating plate group 304 is also identical with the first bottom heating plate group 301, and the group 304 includes a back heating plate 304B and a front heating plate 304F.

The bottom sets of heating plates 301, 302, 303, and 304 may be characterized as together defining a first set of heating plates arranged in pairs, with each pair of heating plates of the first set being vertically aligned with a different one of the top heating plates 281, 282, 283, and 284. The first set of four groups of heating plate pairs is designated in FIG. 9 by the reference number 402.

Downstream of the first set 402 of heating plates is a second set of heating plates 406. The second set 406 includes three groups of heating plates 305, 306, and 307. Each group 305, 306, and 307 includes three separate heating plates. In particular, group 305 includes a back heating plate 305B, a center heating plate 305C, and a front heating plate 305F. Each heating plate 305B, 305C, and 305F has eight, unitary, oval heating pads 400 arranged in two rows of four pads each. The rows are spaced to match, or correspond with, the rows of heating pads in the top heating plate 285.

The three heating plates in the next downstream adjacent group 306 include a back heating plate 306B, a center heating plate 306C, and a front heating plate 306F. These plates are identical with the plates 305B, 305C, and 305F, respectively, discussed above.

The third group 307 includes a back heating plate 307B, a center heating plate 307C, and a front heating plate 307F. These heating plates have the same structure as the above-described other plates in the plate groups 305 and 306.

The second set 406 of bottom heating plates (defined by the groups 305, 306, and 307) may be characterized as being located relative to the first set 402 at a downstream location along the sheet processing path. The second set 406 of bottom heating plates may be further characterized as being arranged in groups of three heating plates, with each group of three heating plates being vertically aligned with a different one of the top heating plates (i.e., top heating plates 285, 286, and 287).

A third set of heating plates is designated in FIG. 9 by the reference number 408. The third set of heating plates 408 includes just one heating plate group 308. The heating plate group 308 includes a back heating plate 308B and a front heating plate 308F. The structure of the heating plates 308B and 308F is identical to the structure of the first group heating plates 301B and 301F, respectively, described above.

The third set 408 of heating plates may be characterized as being located relative to the second set 406 at a downstream location along the sheet processing path. The third set 408 may be further characterized as being arranged in at least one pair vertically aligned with a different one of the top heating plates (i.e., top heating plate 288). The number of pairs of heating plates in the third set 408 is less than the number of pairs of heating plates in the first set 402.

The above-described configuration of bottom heating plates permits the container sheet 90 to be heated in a manner that can be more carefully controlled. Specifically, to heat the sheet 90, the top and bottom heating plates are closed to contact the top and bottom surfaces, respectively, of the sheet 90. This heats the sheet by direct conduction.

In the preferred method of operation, the heating plates are closed in clamping engagement around the sheet 90 for about 3.3 seconds if the sheet 90 has the preferred structure and dimensions described above with reference to FIG. 2.

After the 3.3 second heating step, the top and bottom heating plates are retracted. The sheet 90 is then indexed so as to advance the sheet. The portion of the sheet 90 that was heated between the top heating plate 281 and the underlying bottom heating plates 301B and 301F is thus advanced so that it is located between the second top heating plate 282 and the underlying bottom heating plates 302B and 302F. The top and bottom heating plates are again closed for a 3.3 second heating cycle. This operation sequence is repeated through all of the eight heating substations (i.e., heating substations 271–278).

At each heating substation 271–278, the oval container areas of the sheet 90 between the top and bottom heating plates absorb more thermal energy. Thus the temperature of the sheet oval areas increases with successive advancement of the sheet through the heating station 170.

It has been found that the regions of the sheet 90 between the oval areas heated by the pads 400 also increase in temperature owing to lateral conduction of heat through the sheet 90. Further, as the sheet progresses through the machine, the sheet 90 is subjected generally to increasing temperatures from the atmosphere within the heating station 170. The temperature of the atmosphere within the heating station 170 increases with increasing distance inwardly from the inlet end of the heating station. However, the temperature of the internal atmosphere at the last the heating substation 278 may drop somewhat because it is adjacent the exterior end of the heating station 170.

In order to compensate for the tendency of the sheet 90 to be heated too quickly and/or too much as it progresses through the heating station 170, the temperature of the bottom heating plates can be individually controlled. Preferably, the bottom heating plates, as well as the top heating plates, are electrically heated. Suitable electrical control systems, the details of which form no part of the present invention, are provided for controlling the temperature of each heating plate in response to temperature data transmitted from appropriate sensors in the machine heating station 170.

In the first half of the heating station 157, the temperature across the width of the sheet 90 can be adequately controlled with just two, separate, bottom heating plates and one top heating plate in each substation 271–274. Accordingly, the heating plates in the set 402 in the first half of the bottom heating station 170 are arranged in pairs in each group 301–304. Each plate of a pair can be controlled separately from the adjacent plate of that pair.

However, it has been found to be desirable to have more control over the temperature of the sheet 90 across the width of the sheet in the downstream half of the heating station 170, and particularly in the area of the bottom heating plates comprising the set 406. Thus, in the bottom heating plate set 406, each group of heating plates 305–307 includes three heating plates across the width of the container sheet 90. The temperature of each of the three heating plates in each of these groups can be separately controlled.

In the last bottom heating plate set 408 adjacent the discharge end of the heating station 170, it has been found to be sufficient to provide, and to separately control, only two heating plates across the width of the sheet 90.

It has also been determined that the top heating plates 281–288 can each remain as single, unitary plate which are each controlled to a desired temperature across the entire width of the sheet 90. Any temperature differences across the width of the sheet 90 can be accommodated by control of the bottom heating plates which include the two or three separately controllable, bottom heating plates across the width of the web.

Because the cost and complexity of the system increases with an increasing number of separately controllable heating plates, it has been found that the above-described system is advantageous in that the eight top heating plates 281–288 in each substation can each be maintained as a single heating plate rather than being replaced by two or more heating plates.

It will also be appreciated that the bottom, two-and three-plate groups 301–308 could be employed on the top of the machine, and the top, single heating plates 281–288 could be provided on the bottom of the machine. Of course, the particular temperatures to which the plates in such a modified system would be controlled might be somewhat different owing to upward convective transfer of heat through the internal atmosphere within the heating station 170 and owing to other factors.

Typically, the marginal sections of the sheet 90 and some of the internal mechanisms in the heating station 170 are cooled with appropriate gas flow. The cooling systems, the sterilizing atmosphere system, the mechanisms for extending and retracting the heating plates, and the detailed design and operation of the temperature control system for the heating plates form no part of the present invention.

Forming The Container

After the heated container sheet 90 leaves the heating station 170, the sheet 90 is indexed through the thermoforming station 180. Here a plurality of plugs are lowered into the sheet to deform the sheet downwardly into die cavities which each have the configuration of the exterior of the formed container. Compressed air is injected over the sheet 90 to blow the sheet outwardly away from the plugs and against the walls of the die cavities. The process and apparatus for thermoforming the containers as thus far generally described is conventional and forms no part of the present invention. However, one aspect of the present invention involves the specific design of the shape of the forming plug which is illustrated in FIGS. 11 and 12.

Figure 11:
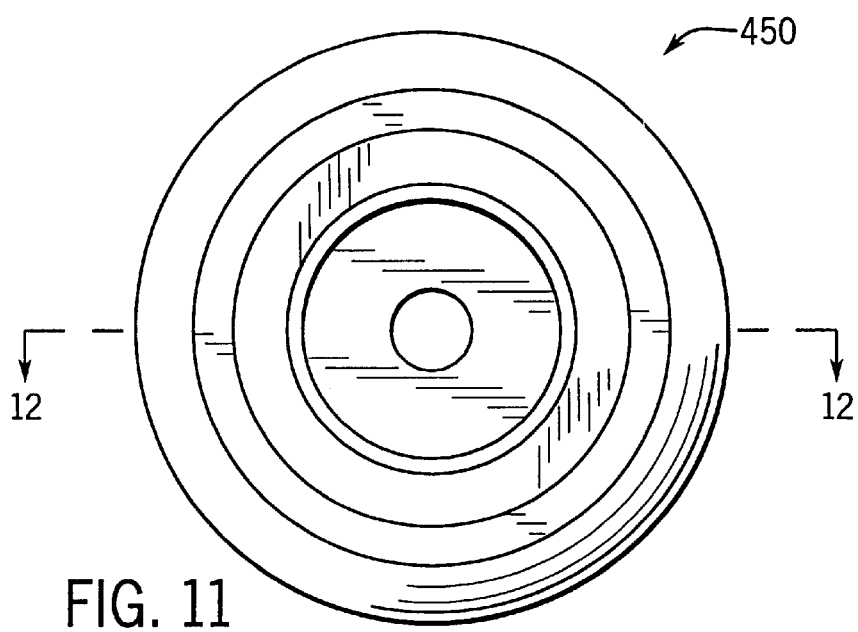
FIG. 11 is a bottom plan view of a container-forming plug embodying features of the present invention.
Figure 12:
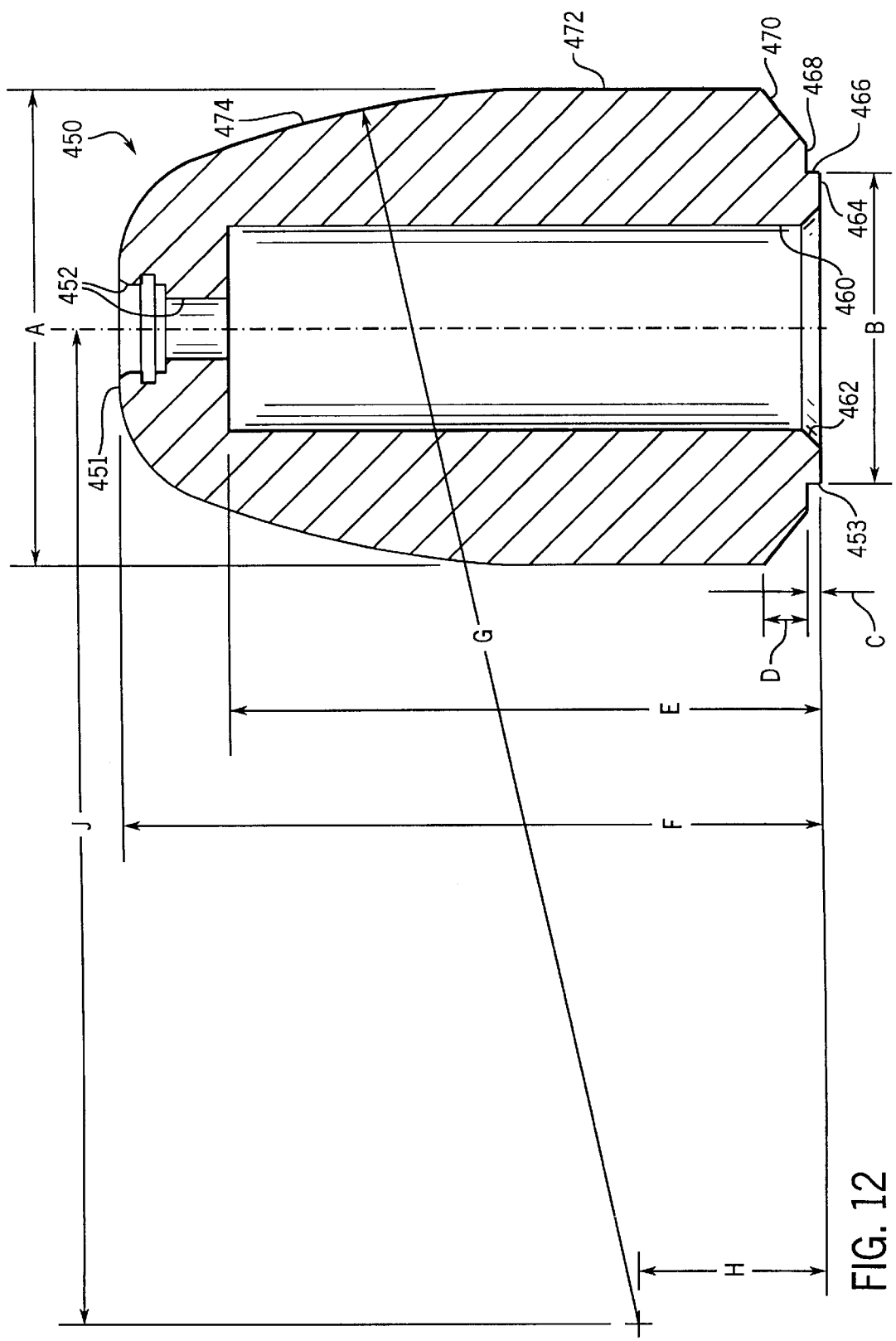
FIG. 12 is a cross-sectional view taken generally along the plane 12—12 in FIG. 11.

The plug is designated generally by the reference number 450 in FIGS. 11 and 12. There are twenty-four such plugs 450 which correspond to the twenty-four heated oval areas in the sheet 90. Each plug 450 has an end 451 defining an opening 452. End 451 is constructed to engage and deform sheet 90. In the preferred embodiment of the present invention, end 451 is positioned vertically above sheet 90. The plug 450 is extended downwardly and retracted upwardly by operation of the actuator such that end 451 deforms sheet 90 in a downward direction. The detailed design and operation of such an actuator forms no part of the present invention relating to the plug contour.

The plug 450 includes an end 453 having a central opening 460 surrounded by a frustoconical surface 462, a flat, annular surface 464, a cylindrical surface 466, an annular shoulder 468, and an angled, frustoconical corner surface 470. The plug 450 also has a cylindrical side surface 472 which merges with an upper arcuate surface 474.

The dimensions of the preferred embodiment of the thermoforming plug 450 are listed below in Table 4 with reference to the dimension designations shown in FIG. 12.

The finish of the exterior surfaces of the plug 450 is smooth. The smooth surface finish, in conjunction with the particular exterior configuration, is highly effective in establishing proper contact with the sheet. This facilitates the proper stretching of the sheet 90 into the die cavity which facilitates the creation of the desired wall thickness profile in the container. The shape and finish of the plug 450 also permits the sheet 90 to be uniformly released from the plug and blown against the die by the injected compressed air.

The preferred embodiment of the plug 450 has been found to work extremely well with the preferred embodiment of the sheet 90 having the structure and composition described above with reference to FIG. 2. The preferred embodiment of the plug 450 is maintained within an appropriate temperature range during operation of the machine 157 so as to facilitate the proper contact between the plug 450 and sheet 90 and so as to facilitate subsequent disengagement of the sheet 90 from the plug 450. Table 4 below identifies the dimensions of the preferred design of the plug 450 illustrated in FIG. 12 with reference to the dimension designations identified in FIG. 12.

TABLE 4

| FIG. 12 Thermoforming Plug Dimension Designation | FIG. 12 Nominal Dimension |
|---|---|
| A | 40 mm. |
| B | 60 mm. |
| C | 1.9 mm. |
| D | 6 mm. |
| E | 83.5 mm. |
| F | 99 mm. |
| G | 100 mm. |
| H | 45 mm |

Sealing The Lid Sheet To The Container Sheet

After the cups or containers have been formed in the sheet 90 by the plugs 450, the sheet is indexed to the lid sealing station 200. The formed sheet 90 moves below, but in registration with, the lid sheet 92 which is advancing from the hydrogen peroxide sterilizing station 220 into the sealing station 200.

Figure 13:
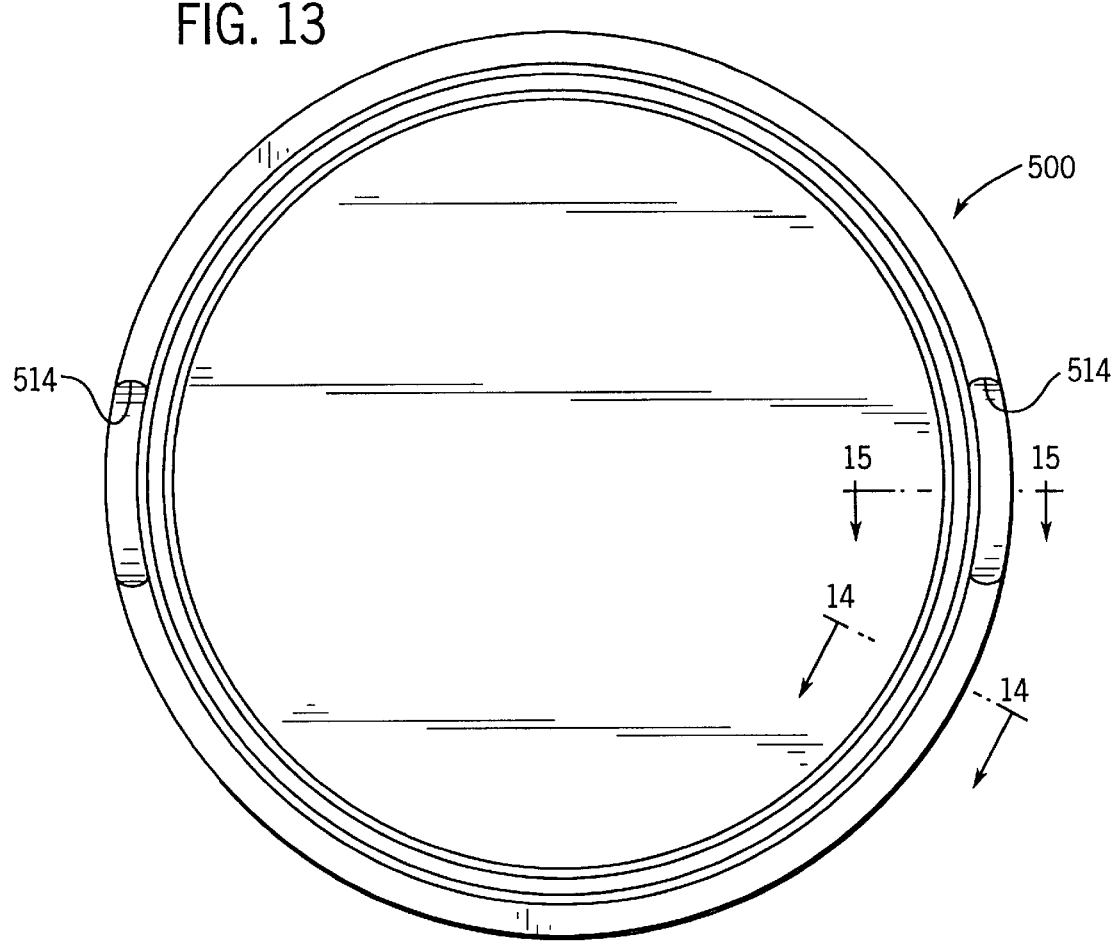
FIG. 13 is a bottom plan view of a heat sealing tool embodying features of the present invention.
Figure 14:
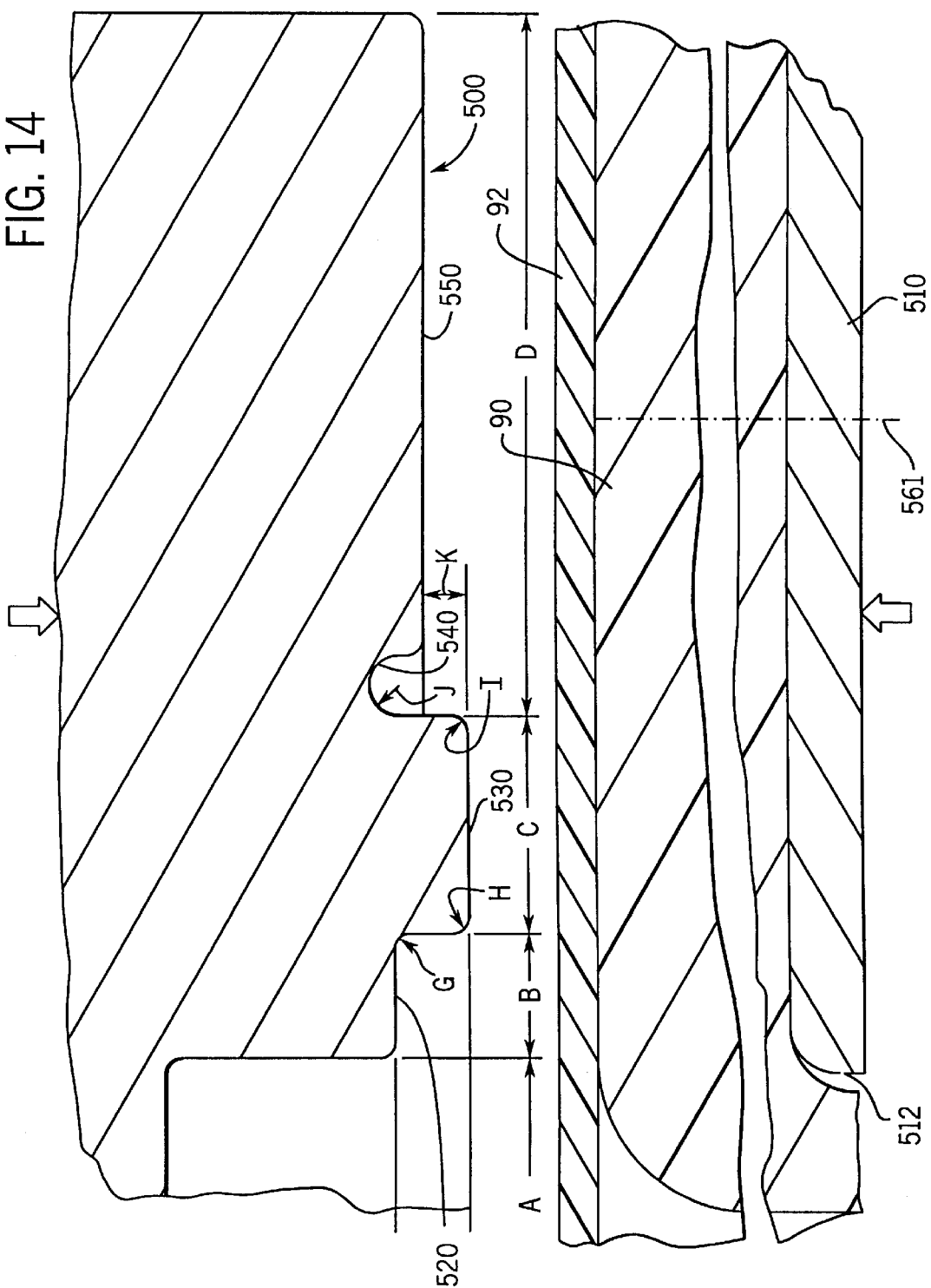
FIG. 14 is a greatly enlarged, fragmentary, cross-sectional view taken generally along the plane 14—14 in FIG. 13, and a lid sheet and container sheet are shown disposed below the tool.
Figure 15:
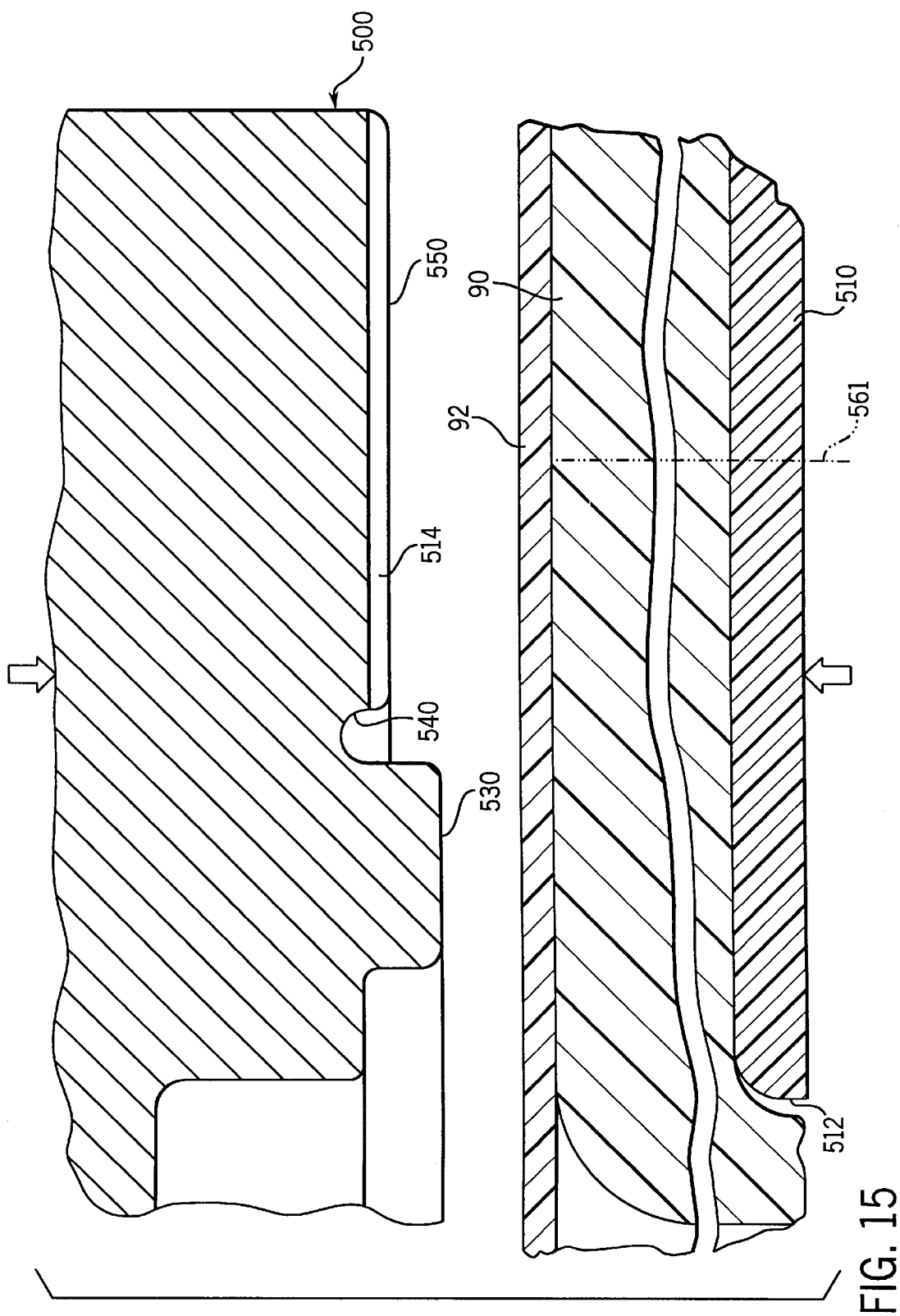
FIG. 15 is a greatly enlarged, fragmentary, cross-sectional view taken generally along the plane 15—15 in FIG. 13.

In the sealing station 200 there are twenty-four lid heat sealing tools 500 (FIGS. 13, 14 and 15). Each of the twenty-four heat sealing tools 500 is adapted to engage a generally circular area of the lid sheet 92 and force it with the underlying container sheet 90 against a vertically reciprocable member 510 around the periphery of each formed container body.

As shown in FIG. 13, each sealing tool 500 has a generally annular sealing face. FIG. 14 shows the tool sealing face cross sectional profile which is uniform circularly around the tool except in two areas where the profile is altered by two recesses 514 (FIGS. 13 and 15). When the lid seal tool 500 is used to seal the preferred lid sheet 92 (having the preferred composition and structure described above with reference to FIG. 5) to the preferred embodiment of the container sheet 90 (described above with reference to FIG. 2), the sealing tool preferably has the dimensions set forth in Table 5 below with reference to the dimension designations in FIG. 14.

TABLE 5

| FIG. 14 Lid Seal Tool Dimension Designation | FIG. 14 Lid Seal Tool Dimension (mm.) |
|---|---|
| A | 69.0 |
| B | 0.7 |
| C | 1.2 |
| D | 4.1 |
| E | 0.5 |
| F | 0.6 |
| G | 0.5 |
| H | 0.5 |
| I | 0.2 |
| J | 0.2 |
| K | 0.3 |

With reference to FIG. 14, the sealing tool 500 includes an inner, annular relief surface 520. Adjacent the relief surface 520 is a flat sealing surface defined at the bottom of a downwardly projecting, annular ring 530. At the outer edge of the ring 530 is an upwardly extending annular groove 540 which is open downwardly. Extending radially outwardly from the groove 540 is a flat, outer, annular relief step surface 550.

When the sealing station is actuated, each sealing tool 500 is extended downwardly at the same time the support member 510 is extended upwardly so as to press the lid sheet 92 and container sheet 90 between the tool 500 and support member 510.

The support member 510 includes twenty-four apertures 512 for each receiving the portion of the container which projects downwardly from the thicker, horizontally disposed sheet 90 which is supported on the top surface of the support member 510. An annular portion of the horizontal sheet 90 adjacent the aperture 512 will ultimately be separated from the rest of the sheet 90 (as at radius 561 in FIGS. 14 and 15) to form the flange of the container (i.e., flange 70 as shown in FIG. 3).

When the lid sheet 92 and container sheet 90 are squeezed between the support member 510 and sealing tool 500, a seal structure is formed with the unique configuration as described above in detail with reference to FIG. 6 which shows the completed seal.

The sealing tool 500 is electrically heated to a temperature ranging between about 245° C. and about 255° C. When the preferred lid sheet 92 (having the preferred composition and structure described above with reference to FIG. 5) is sealed to the preferred container sheet 90 (having the preferred composition and structure described above with reference to FIG. 2) with the preferred form of the tool 500 described above with reference to Table 5, then the sheets 90 and 92 are preferably squeezed together with a force of between about 85 and about 105 kilonewtons for a period of time ranging between about 1.8 and about 1.9 seconds. This provides a strong seal that has a high burst strength and that has the configuration shown in FIG. 6.

It will be appreciated that the inner, annular relief surface 520 and the annular groove 540 of the sealing tool 500 accommodate upward deformation of the sheet material (as at bulge 140 and bulge 142 shown in FIG. 6) as the ring 530 creates the recessed region in the seal (i.e., the region 138 as shown in FIG. 6). This results in the formation of the upset beads 131 and 133 in the lid flange 70 (as seen in FIG. 6). This also accommodates the lateral displacement of the bottom layers 105 and 104 of the lid material to form the beads 132 and 134 (as seen in FIG. 6). This also accommodates the formation of the high strength, leak-tight heat seals 121 and 122 between the beads 131 and 132, and between the beads 133 and 134, respectively.

It will be noted that the sealing tool 500 has a relatively wide, annular surface 550 outwardly of the groove 540. The surface 550 is almost four times wider than the surface of the ring 530. The wide surface 550 facilitates the transfer of a large amount of thermal energy into the underlying sheets 90 and 92. The additional thermal energy contributes to the creation of robust heat seals 121 and 122 at workable operating ranges.

Because the outer, peripheral surface 550 is higher than the surface of the projecting ring 530, the pressure on the sheets 90 and 92 under the surface 550 is considerably less than the pressure exerted by the projecting ring 530. This prevents the creation of a full, high-strength seal between the sheets 90 and 92 under the tool outer, annular surface 550. The sheets 90 and 92 in this area are only lightly bonded or tacked. The lightly bonded or tacked region extends radially outwardly beyond the outer edge of the cup flange that will be subsequently defined when the package is severed from the two sheets at the die cutting station 230. The die cutting apparatus will cut the lid and flange out of the two sheets in the lightly bonded or tacked region which is created under the radially outer, annular region of the tool surface 550.

The unique profile of the sealing tool 500 illustrated in FIGS. 13–14 produces a heat seal connection of the lid 40 to the container flange 70 which is substantially devoid of wrinkles in the lid material. The seal is relatively strong, and yet the seal still permits the lift-up tab 42 in the finished package to be free of any bonding to the underlying portion of the lid 40.

Because the seal structure produced with the sealing tool 500 prevents, or substantially minimizes, the production of wrinkles in the lid material, there are no channels or passages created through the annular heat seals which could result in leakage or which could otherwise deleteriously affect the integrity of the seals.

The recesses 514 in two areas of the face of the sealing tool 500 are aligned along the lid tab hinge 96 (FIGS. 4, 5, 16, and 17). The recesses 514 are located radially on the sealing tool 500 so as to extend inwardly beyond what will become the outer edge of the lid. Thus, with reference to FIG. 16, an inner portion of each recess 514 in the sealing tool 500 results in the creation of the peripheral areas 151. Because the tool recessed areas 514 prevent the application of pressure to the area of the lid in the regions 151, each region 151 is bonded only very lightly or not at all. This permits the user to more easily open the lid by pulling up on the tab 42 as shown in FIG. 17 and as previously described in detail with reference to FIG. 17.

During operation of the heat sealing station 220, the support member 510 and the heat sealing tools 500 are reciprocated toward and away from each other by suitable conventional mechanisms in the machine 157, the details of which mechanisms form no part of the present invention. The electrical heating system for the sealing tools 500 and the controls for the electrical heating system may include any appropriate design and or modification of conventional systems in the machine 157. Accordingly, the detailed design and operation of such systems form no part of the present invention.

Die-Cutting the Container

Figure 18:
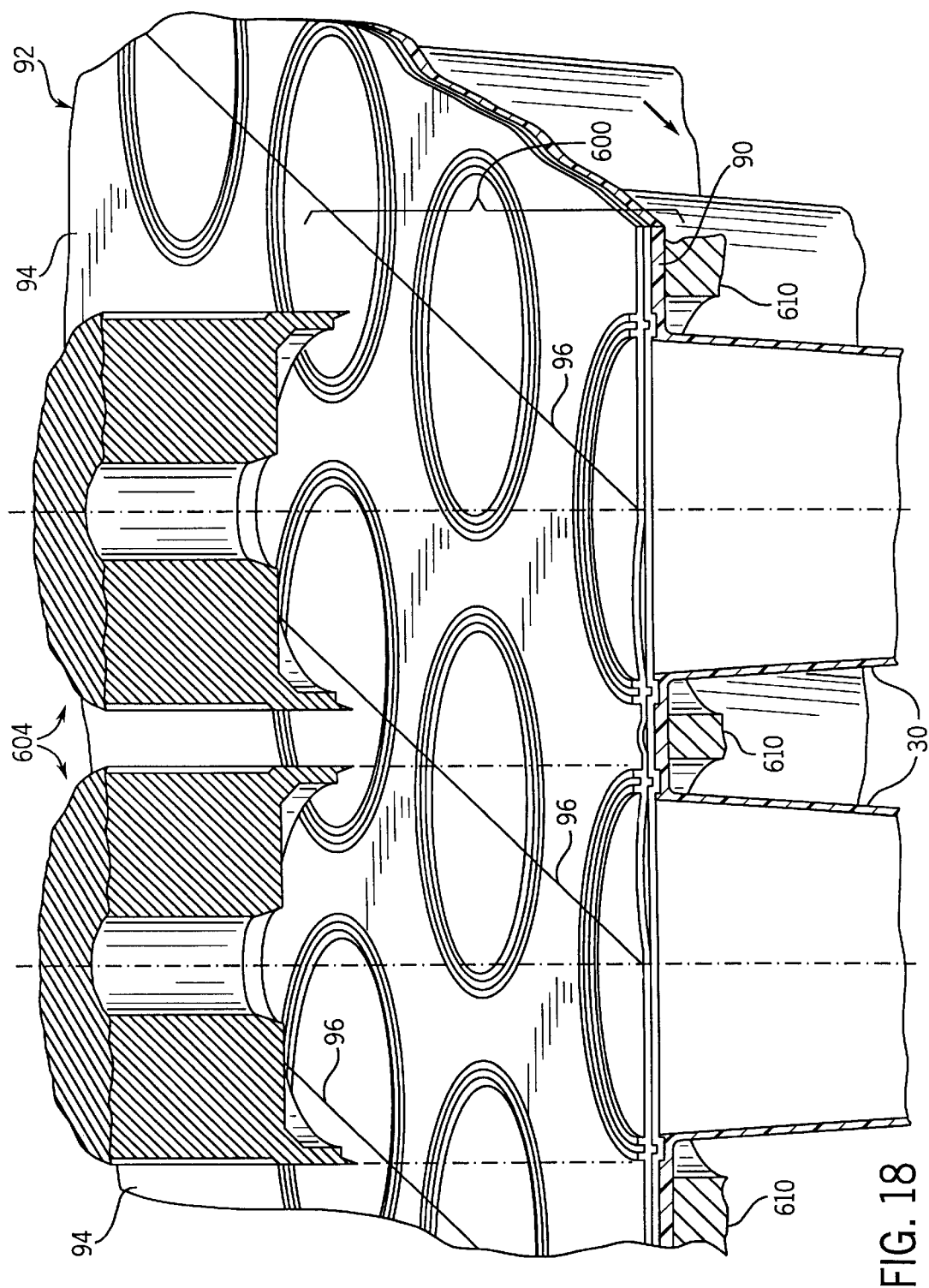
FIG. 18 is a fragmentary perspective view of a portion of the die-cutting station of the machine shown in FIG. 7 and illustrating the modified punch and die sets incorporating features of the present invention.

After the sheets 92 and 90 are sealed together in the sealing station 220, the sealed assembly is advanced to the die-cutting or trim station 230. The die-cutting station 230 includes twenty-four punch and die tool sets, two of which are shown in FIG. 18 wherein they are designated generally by the reference number 600. Each tool set 600 includes a punch 604 and a die 610.

During operation of the die-cutting station 230, the punches 604 and the dies 610 move toward and away from each other by suitable mechanisms (not illustrated). These may be of any appropriate conventional or special design, the details of which form no part of the present invention.

Figure 19:
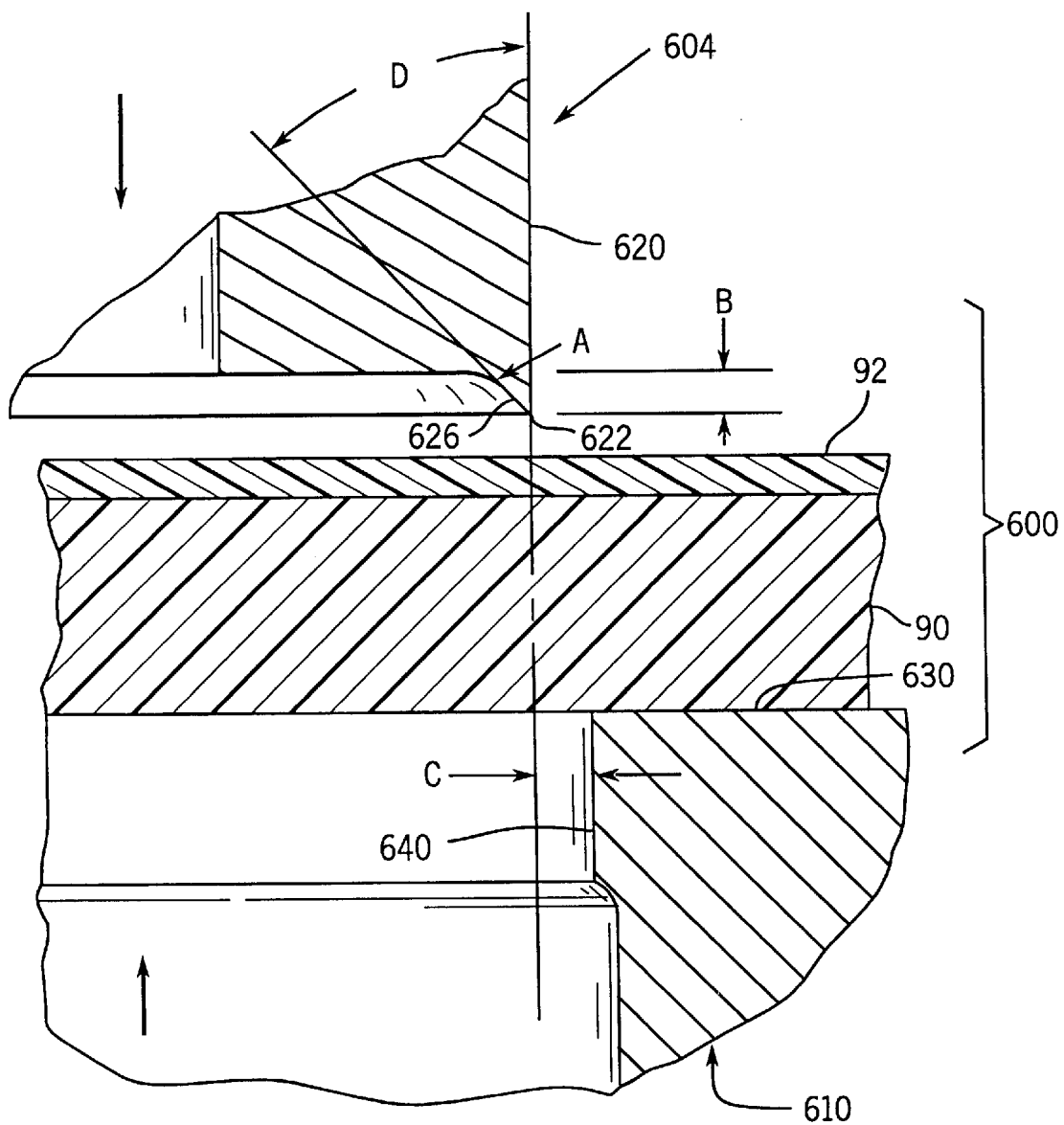
FIG. 19 is a fragmentary, cross-sectional view of one of the punch and die sets shown in FIG. 18.

Each punch 604 has a generally cylindrical, lower outer surface 620 terminating in a bottom, distal edge 622. As best shown in FIG. 19, the punch 604 has a frustoconical inner surface 626 which intersects the exterior cylindrical surface 620 at the distal end 622. In the preferred embodiment, the frustoconical surface 626 defines an included angle D of about 44.43 degrees with respect to the surface 620. This provides an acute angle peripheral cutting edge at the bottom end 622. The diameter of the cutting edge bottom end 622 is substantially equal to the outer diameter of the container flange that is to be defined when the completed package is severed from the sheets 92 and 90 by the punch.

As further shown in FIG. 19, the die 610 includes an upper support surface 630 and defines an aperture 640 for receiving the portion of the container or cup which extends downwardly from the sheet 90. Before the sheets 90 and 92 are advanced forward to bring the formed cups into the die-cutting station 230, the dies 610 are in a lowered, retracted position so that the downwardly projecting containers can be advanced over the dies and into a position in registration with the apertures 630. Subsequently, when the die-cutting station 230 is operated, the dies 610 move upwardly[ ]around the downwardly projecting containers to engage the bottom surface of the portions of the sheet 90 extending between the containers. This occurs at the same time that the punches 604 are extended downwardly into the sheets 92 and 90.

The preferred embodiment of the punch and die set 600 is designed for cutting the preferred lid sheet 92 (having the preferred structure and composition described above with reference to FIG. 5) and to cutting the preferred container sheet 90 (having the preferred structure and composition described above with reference to FIG. 2). In the preferred embodiment of the punch and die set 600, the aperture 640 in the die 610 is sufficiently large to provide a radial clearance C (FIG. 19) of about 0.2 inch between the exterior cylindrical surface 620 of the punch 604 and the interior surface of the die 610. Also, in the preferred embodiment of the punch and die set 600, the punch cutting edge projects downwardly a distance B (FIG. 19) which is preferably about 0.3 inch. The preferred peripheral cutting edge acute angle D is about 44.43 degrees. The preferred radius A is about 1 inch.

As the punch 604 and die 610 are moved toward each other, the punch cuts into the sheets 92 and 90 and severs the package from the remaining peripheral portion of the sheets 92 and 90. The punch 604 cuts through the sheets 92 and 90 in the area of the connection between the lid sheet 92 and container sheet 90 which is only lightly bonded, and this is the radially outwardly portion of the region 150 described above with reference to FIG. 6.

Preferably, both the die and the punch are cooled by conventional systems (the details of which form no part of the present invention) so as to keep the temperature of the punch and die within about 5° C. of each other. This prevents differential expansion which might create interference.

During the operation of the punch and die it is preferred to maintain some amount of tension on the sheets 92 and 90. The punch 604 and die 610 are operated so that they both move along a line of action that is substantially perpendicular to the plane of the sheets 92 and 90.

The preferred form of the punch and die set 600, when operated according to the preferred process as described above, creates a very clean, smooth cut around the peripheral edge of the package lid 40 and container flange 70 (FIG. 1). This compares very favorably with other, conventional punch and die set apparatus and processes which do not produce a very clean and smooth edge on materials such as polypropylene. Such other apparatus and processes typically create filaments of material hanging from the area of the cut edge, and these are typically referred to as "filaments," "angel hairs," "strands," or "stringers". These are not desirable, especially when it is intended that a user will drink from the open cup. The package created with the punch and die set 600 of the present invention substantially minimizes, or eliminates the creation of such angel hairs or filaments.

It will be readily apparent from the foregoing detailed description of the invention and from the illustrations thereof that numerous variations and modifications may be effected without departing from the true spirit and scope of the novel concepts or principles of this invention.

What is claimed is:

1. An apparatus for heating a portion of a web material, said apparatus comprising:

a top heating plate, the top heating plate having a top pad to be conductively heated by said top heating plate, said top pad having an oval configuration defined by a minor axis and a major axis of a length greater than the minor axis, the major axis being aligned along a feed direction of a web material to be moved relative to the apparatus, said top pad constructed to contact and heat conductively a first surface of a web material; and a bottom heating plate, the bottom heating plate having a bottom pad to be conductively heated by said bottom heating plate, said bottom pad having an oval configuration defined by a minor axis and a major axis of a length greater than the minor axis, the bottom pad facing the top pad with the major axis of the bottom pad aligned along the feed direction, the bottom pad constructed to contact and heat conductively a second surface of the web material opposite the first surface.

2. An apparatus for heating a portion of a web material, said apparatus comprising:

a first top heating plate, a plurality of top pads associated with said first top heating plate to be heated conductively by said first top heating plate, said plurality of top pads constructed to contact and heat conductively a first surface of a web material; and a first bottom heating plate assembly including a first bottom heating plate, a first plurality of bottom pads associated with said first bottom heating plate to be heated conductively by said first bottom heating plate, said first plurality of bottom pads constructed to contact and heat conductively a corresponding first section of a second surface of the web material, and a second bottom heating plate, a second plurality of bottom pads associated with said second bottom heating plate to be heated conductively by said second bottom heating plate, said second plurality of bottom pads constructed to contact and heat conductively a corresponding second section of the second surface of the web material, the first bottom heating plate and the second bottom heating plate in side-by-side relation across a width of the web material, said second bottom heating plate controlled independently of said first bottom heating plate;

said first top heating plate and said first bottom heating plate assembly aligned such that each one of said plurality of top pads of said first top heating plate is aligned with a corresponding bottom pad of said first bottom heating plate assembly.

3. An apparatus for heating a portion of a web material in accordance with claim 2, wherein said first bottom heating plate assembly further includes a third bottom heating plate, a third plurality of bottom pads associated with said third bottom heating plate to be heated conductively by said third bottom heating plate, said third plurality of bottom pads constructed to contact and heat conductively a corresponding third section of the second surface of web material, said third bottom heating plate in side-by-side relation with the first and second bottom heating plates across the width of the web material and controlled independently of said first bottom heating plate and said second bottom heating plate.

4. An apparatus for heating a portion of a web material in accordance with claim 3, wherein each of said top pads and said bottom pads has an oval configuration defined by a minor axis and a major axis of a length greater than the minor axis, with the major axis aligned along a feed direction of a web material to be moved relative to the apparatus.

5. An apparatus for heating a portion of a web material in accordance with claim 2, wherein said apparatus further comprises:

a second top heating plate, a plurality of top pads associated with said second top heating plate to be heated conductively by said second top heating plate, said plurality of top pads constructed to contact and heat conductively the first surface of a web material; and a second bottom heating plate assembly including
a first bottom heating plate, a first plurality of bottom pads associated with said first bottom heating plate to be heated conductively by said first bottom heating plate of the second bottom heating plate assembly, said first plurality of bottom pads constructed to contact and heat conductively a corresponding first section of a second surface of a web material, and
a second bottom heating plate, a second plurality of bottom pads associated with said second bottom heating plate to be heated conductively by said second bottom heating plate of the second bottom heating plate assembly, said plurality of bottom pads constructed to contact and heat conductively a corresponding second section of the second surface of web material, said second bottom heating plate of the second bottom heating plate assembly controlled independently of said first bottom heating plate of the second bottom heating plate assembly;

said second top heating plate and said second bottom heating plate assembly aligned such that each one of said plurality of top pads of said second top heating plate is aligned with a corresponding bottom pad of said second bottom heating plate assembly.

6. An apparatus for heating a portion of a web material in accordance with claim 5, wherein said apparatus further comprises means for moving a web material through said apparatus from an upstream position to a downstream position, and wherein said second top heating plate is downstream relative to said first top heating plate and wherein said second bottom heating plate assembly is downstream relative to said first bottom heating plate assembly.

7. An apparatus for heating a portion of a web material, said apparatus comprising:

a first top heating plate, a plurality of top pads associated with said first top heating plate to be heated conductively by said first top heating plate, said plurality of top pads constructed to contact and heat conductively a first surface of a web material; and a first bottom heating plate assembly including
a first bottom heating plate, a first plurality of bottom pads associated with said first bottom heating plate to be heated conductively by said first bottom heating plate, said first plurality of bottom pads constructed to contact and heat conductively a corresponding first section of a second surface of a web material, and
a second bottom heating plate, a second plurality of bottom pads associated with said second bottom heating plate to be heated conductively by said second bottom heating plate, said second plurality of bottom pads constructed to contact and heat conductively a corresponding second section of the second surface of web material;

said first top heating plate and said first bottom heating plate assembly aligned such that each of said top pads is aligned with and facing a corresponding one of said bottom pads, and further wherein each of said top pads and each of said bottom pads has an oval configuration defined by a minor axis and a major axis of a length greater than the minor axis, with the major axis aligned along a feed direction of a web material to be moved relative to the apparatus.

* * * * *